United States Patent
Lakhani et al.

(10) Patent No.: US 9,524,324 B1
(45) Date of Patent: Dec. 20, 2016

(54) FRAMEWORK FOR PERFORMING UPDATES OF GLOBALLY SHARED DATA IN A MULTIPROCESSOR ENVIRONMENT

(71) Applicants: Ashutosh Lakhani, Karnataka (IN); Roii Raz, Providence, RI (US); Ghil Iancovici, Newton, MA (US); Li Lang, Newton, MA (US); Gabriel Hershkovitz, Newton, MA (US)

(72) Inventors: Ashutosh Lakhani, Karnataka (IN); Roii Raz, Providence, RI (US); Ghil Iancovici, Newton, MA (US); Li Lang, Newton, MA (US); Gabriel Hershkovitz, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 543 days.

(21) Appl. No.: 13/726,805

(22) Filed: Dec. 26, 2012

(51) Int. Cl.
*G06F 9/30* (2006.01)
*G06F 17/30* (2006.01)

(52) U.S. Cl.
CPC .............................. *G06F 17/30575* (2013.01)

(58) Field of Classification Search
None
See application file for complete search history.

(56) References Cited

U.S. PATENT DOCUMENTS

| | | | |
|---|---|---|---|
| 2002/0013872 A1* | 1/2002 | Yamada | 710/240 |
| 2005/0044128 A1* | 2/2005 | Scott et al. | 709/200 |
| 2008/0028196 A1* | 1/2008 | Kailas | 712/245 |
| 2010/0125550 A1* | 5/2010 | Imamura et al. | 707/613 |
| 2012/0047140 A1* | 2/2012 | McKenney et al. | 707/737 |

* cited by examiner

*Primary Examiner* — William B Partridge
(74) *Attorney, Agent, or Firm* — Muirhead and Saturnelli, LLC

(57) ABSTRACT

Described are techniques for processing a request to update a globally shared data item. The request is received at a first processor designated as the master processor. Other processors are designated as non-master processors. The first processor sends a synchronization request message to the other processors. The first processor waits a predetermined amount of time for the other processors to signal to the first processor regarding commitment in executing the request. Responsive to the first processor receiving the signal from the other processors first processing is performed that includes the first processor notifying the other processors regarding completion of a first synchronization point, updating the globally shared data item by said first processor, and waiting, by the other processors, for notification from the first processor regarding completion of a second synchronization point thereby indicating that updating of the globally shared data item is completed.

20 Claims, 14 Drawing Sheets

FRAMEWORK FOR PERFORMING UPDATES OF GLOBALLY SHARED DATA IN A MULTIPROCESSOR ENVIRONMENT

BACKGROUND

Technical Field

This application generally relates to performing synchronized updates in connection with globally shared data.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

In a data storage system, or more generally any suitable system, multiple processors may have access to globally shared data used by the multiple processors. In a data storage system, configuration data may be one example of globally shared data that may be used by multiple processors. The configuration data may describe various aspects of the data storage system configuration. When there is a change to the data storage configuration such as by one of the multiple processors, the configuration data may be accordingly updated. In order for the updated configuration data to be utilized by the multiple processors, one technique includes rebooting the multiple processors of data storage system with each modified or updated set of configuration data. Such rebooting can be disruptive, for example, to hosts issuing I/Os to the data storage system. It may be desirable to use a flexible and efficient technique in connection with performing such modifications to globally shared data where the globally shared data may be updated and provided in a synchronized manner to the multiple processors for use. It may be desirable to have the updated globally shared data used by the multiple processors without requiring the processors to reboot thereby minimizing interruptions to host I/Os.

SUMMARY OF THE INVENTION

In accordance with one aspect of the invention is a method of processing a request to update a globally shared data item comprising: receiving the request at a first processor to update the globally shared data item, wherein the first processor is one of a plurality of processors which access the globally shared data item, the first processor being a master processor and each of the other ones of the plurality of processors being a non-master processor; sending, by the first processor to each of the other ones of the plurality of processors, a synchronization request message; waiting, by the first processor, a predetermined amount of time for each of the other ones of the plurality of processors to signal to the first processor in response to the synchronization request message that each other processor commits to executing the request to update the globally shared data item; determining whether the first processor receives the signal from each of the other ones of the plurality of processors indicating commitment to executing the request to update the globally shared data item; and responsive to determining that all the other ones of the plurality of processors signal the first processor indicating commitment to executing the request to update the globally shared data item, performing first processing including: notifying, by the first processor, each of the other ones of the plurality of processors regarding completion of a first synchronization point; updating the globally shared data item by the first processor; and waiting, by each of the other ones of the plurality of processors, for notification from the first processor regarding completion of a second synchronization point thereby indicating that updating of the globally shared data item is completed. The other ones of the plurality of processors may be delayed from further execution until the first processor sends notification regarding completion of the first synchronization point, and wherein the other ones of the plurality of processors may be delayed from further execution until the first processor sends notification regarding completion of the second synchronization point. The method may also include aborting the request if the first processor does not receive the signal from at least one of the other ones of the plurality of processors whereby not receiving the signal indicates that the at least one processor does not commit to executing the request to update the globally shared data item. Responsive to each of the other ones of the plurality of processors receiving notification from the first processor regarding completion of the second synchronization point, each processor performs second processing to accordingly update one or more other data items dependent on the globally shared data item. Each of the one or more other data items may be any of a copy of at least a portion of the globally shared data item and a data item derived from the globally shared data item. At least a first of the one or more other data items are stored locally in a private memory accessible only to each processor. At least a first of the one or more other data items may be stored in a memory shared by each processor and any other of the plurality of processors located on a same board as said each processor. If one of the other ones of the plurality of processors fails to reach the second synchronization point, the one processor may be disabled by the first processor to prevent the one processor from continuing execution. If the first processor fails to reach the second synchronization point, the first processor may be disabled thereby preventing the first processor from continuing execution and the globally shared data item may be restored to its state prior to performing the step of updating the globally shared data item by the first processor. The method may also include waiting, by each of the other ones of the plurality of processors, for notification from the first processor regarding completion of a third synchronization point thereby indicating that updating of one or more other data items by each of the other ones of the plurality of processors is completed. The other ones of the plurality of processors may be delayed from further execution until the first processor sends notification regarding completion of the third synchronization point. The first synchronization point and the second synchronization point may be included in a plurality of synchronization points corresponding to steps in a transaction performed to execute the request to update the globally shared data item. The plurality of synchronization points may include at least four synchronization points, wherein the other ones of the plurality of processors may be delayed from further execution at each of the plurality of synchronization points until receiving notification from the first processor that said each synchronization point is completed. A global identifier may be associated with the request to update the globally shared data item. The global identifier may denote a globally unique identifier differentiating the request from any other request to update any globally shared data item accessible to the plurality of processors. Each of the first synchronization point and the second synchronization point may be associated with a synchronization point identifier determined using the global identifier. N synchronization points may be associated with the global identifier, N being an integer greater than two, and wherein the synchronization point identifier may identify an $i^{th}$ of the N synchronization points associated with the global identifier, where "i" may be an integer greater than zero and less than N+1. The synchronization point identifier identifying the $i^{th}$ synchronization point of the request identified by the global identifier may be calculated as a sum of a first quantity and a value of "i", and the first quantity may be a mathematical product of the global identifier multiplied by N denoting the total number of synchronization points associated with the global identifier.

In accordance with another aspect of the invention is a computer readable medium comprising code stored thereon for processing a request to update a globally shared data item, the computer readable medium comprising code stored thereon for: receiving the request at a first processor to update the globally shared data item, wherein the first processor is one of a plurality of processors which access the globally shared data item, the first processor being a master processor and each of the other ones of the plurality of processors being a non-master processor; sending, by the first processor to each of the other ones of the plurality of processors, a synchronization request message; waiting, by the first processor, a predetermined amount of time for each of the other ones of the plurality of processors to signal to the first processor in response to the synchronization request message that said each other processor commits to executing the request to update the globally shared data item; determining whether the first processor receives the signal from each of the other ones of the plurality of processors indicating commitment to executing the request to update the globally shared data item; and responsive to determining that all the other ones of the plurality of processors signal the first processor indicating commitment to executing the request to update the globally shared data item, performing first processing including: notifying, by the first processor, each of the other ones of the plurality of processors regarding completion of a first synchronization point; updating the globally shared data item by the first processor; and waiting, by each of the other ones of the plurality of processors, for notification from the first processor regarding completion of a second synchronization point thereby indicating that updating of the globally shared data item is completed. The other ones of the plurality of processors may be delayed from further execution until the first processor sends notification regarding completion of the first synchronization point, and wherein the other ones of the plurality of processors may be delayed from further execution until the first processor sends notification regarding completion of the second synchronization point. The computer readable medium may further comprise code for aborting the request if the first processor does not receive said signal from at least one of said other ones of the plurality of processors whereby not receiving said signal indicates that said at least one processor does not commit to executing the request to update the globally shared data item.

In accordance with another aspect of the invention is a system comprising: a plurality of processors; a global memory including a globally shared data item accessed by said plurality of processors; a computer readable medium comprising code stored thereon for processing a request to update the globally shared data item, the computer readable medium comprising code for: receiving the request at a first of the plurality of processors to update the globally shared data item, said first processor being a master processor and each of the other ones of the plurality of processors being a non-master processor; sending, by the first processor to each of said other ones of the plurality of processors, a synchronization request message; waiting, by the first processor, a predetermined amount of time for each of the other ones of the plurality of processors to signal to the first processor in response to the synchronization request message that said each other processor commits to executing the request to update the globally shared data item; determining whether the first processor receives said signal from each of said other ones of the plurality of processors indicating commitment to executing the request to update the globally shared data item; and responsive to determining that all said other ones of the plurality of processors signal said first processor indicating commitment to executing the request to update the globally shared data item, performing first processing including: notifying, by said first processor, each of said other ones of the plurality of processors regarding completion of a first synchronization point; updating the globally shared data item by said first processor; and waiting, by each of said other ones of the plurality of processors, for notification from the first processor regarding completion of a second synchronization point thereby indicating that updating of the globally shared data item is completed.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
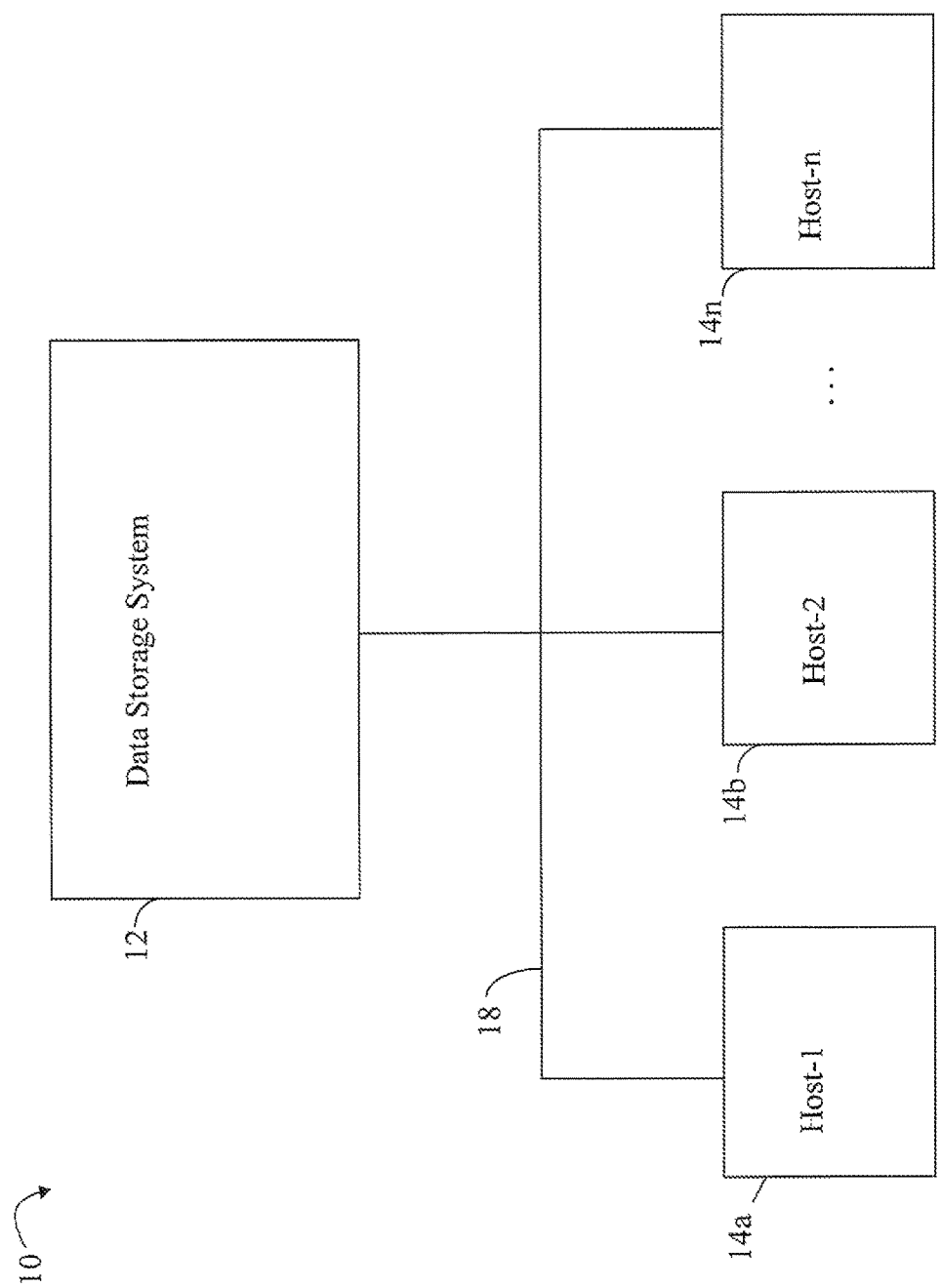
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP. SCSI, Fibre Channel, or iSCSI, and the like. Some or all of the connections by which the hosts and data storage system 12 may be connected to the communication medium 18 may pass through other communication devices that may exist such as switching equipment, a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
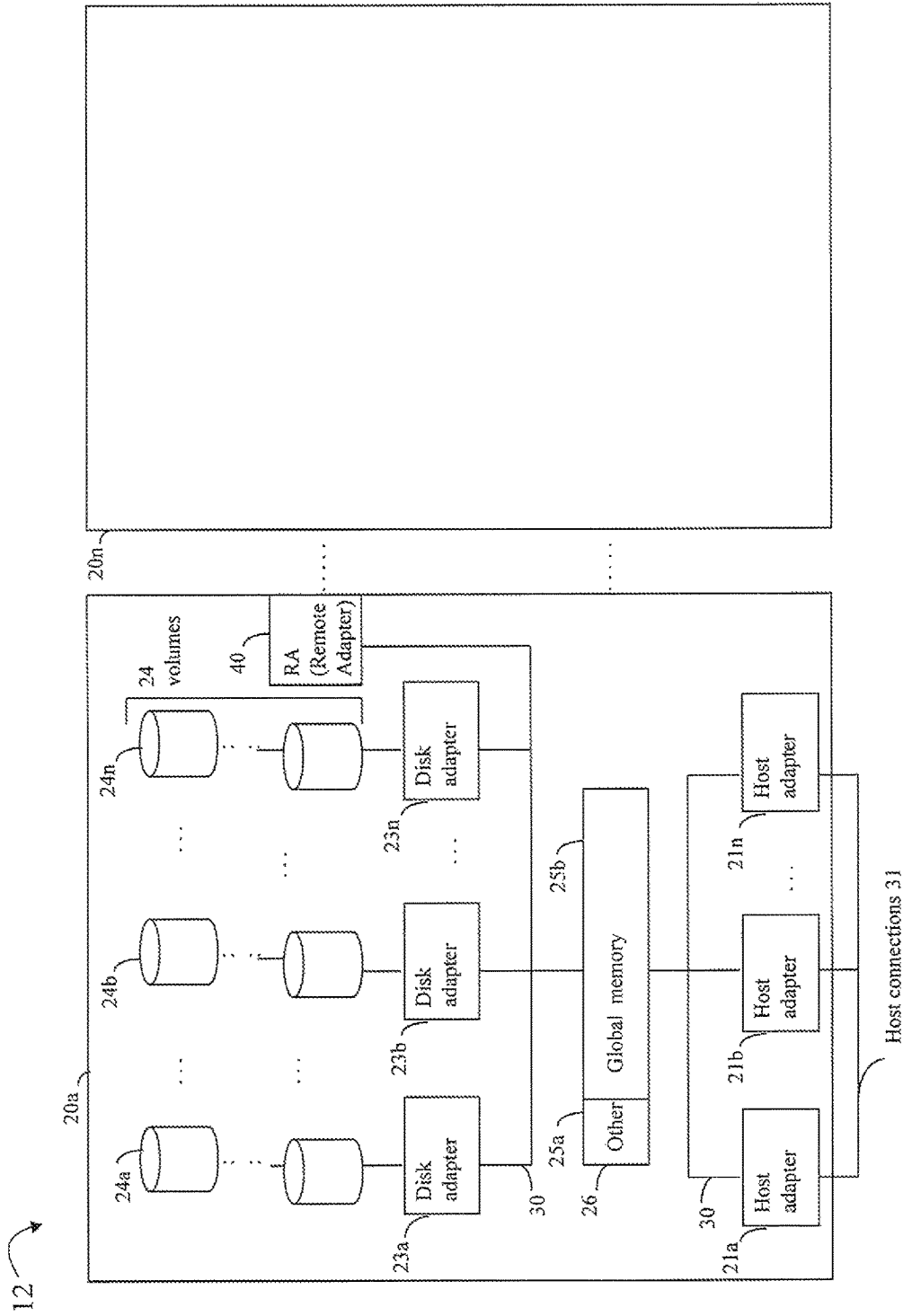
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host, such to ports of a host bus adapter (HBA). Such components which communicate with the host may also be referred to as front end components of the data storage system. A component of the data storage system which communicates with a front end component, such as a DA, may be characterized as a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual or physical disk drives. For example, one or more LVs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LV(s) residing thereon. A LUN or logical unit number may be characterized as a disk array or data storage system reference to an amount of disk space that has been formatted and allocated for use to one or more hosts. An LV may further map, for example, to a single LUN, more than one LUN, and/or a portion of a LUN.

The DA performs I/O operations on a disk drive. Data residing on an LV may be accessed by the DA following a data request in connection with I/O operations that other directors originate.

Figure 2B:
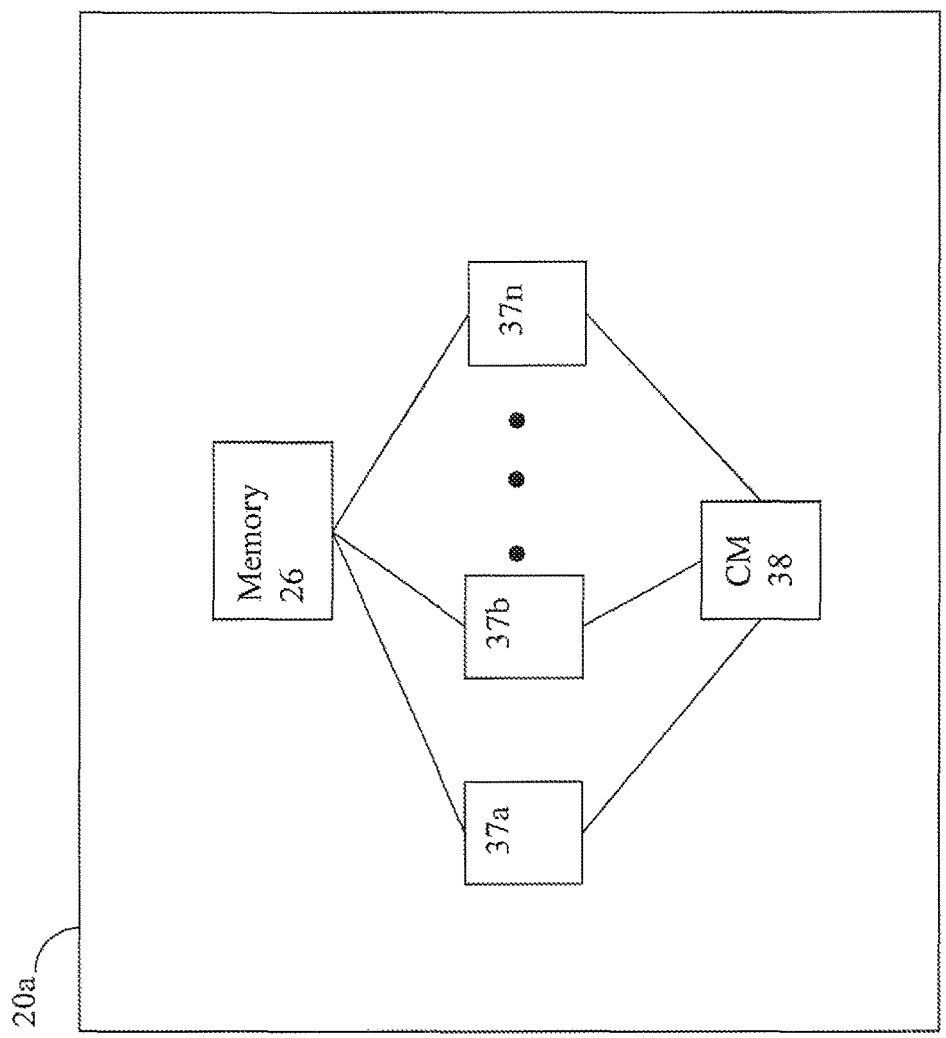
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HA's, RA's, or DA's that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In a data storage system, or more generally any suitable system, multiple processors such as included in the different directors (e.g., FAs, DAs, and the like) may have access to globally shared data used by the multiple processors. In the data storage system, configuration data stored in globally memory (GM) may be one example of globally shared data used by multiple processors. The configuration data may describe various aspects of the data storage system configuration. When there is a change to the data storage configuration such as by one of the multiple processors, the configuration data may be accordingly updated. Generally, configuration data may describe various aspects of how storage resources of the data storage system are configured. For example, configuration data may identify what physical devices are used to configure particular RAID groups, what is the RAID configuration and layout of such RAID groups, what LUNs are configured from storage of particular RAID groups, what are the attributes of LUNs and other data storage system entities, what DAs service which physical devices, and the like. Configuration data is an example of globally shared data that may be updated, sometimes frequently. Updates to globally shared data need to be performed in a synchronized manner, for example, to ensure that multiple processors are not accessing the same data being updated. Additionally, the updated globally shared data may be further propagated to the multiple processors for use whereby the multiple processors may update any other data items dependent on the updated globally shared data. Such other dependent data items may include, for example, local copies of global data items or local data items which are derived from the globally shared data (whereby a change to the globally shared data may cause a change to the local data item).

Described in following paragraphs are techniques used in connection with performing such modifications to globally shared data. The globally shared data may be updated and provided in a synchronized manner to the multiple processors so that other data items dependent on the modified globally shared data may be accordingly updated in a synchronized manner. Such techniques may be performed without requiring the processors to reboot thereby minimizing interruptions to host I/Os.

In following paragraphs, reference may be made to configuration data as a particular example illustrating use of techniques herein with globally shared data in a data storage system. However, as will be appreciated by those of ordinary skill in the art, techniques herein may be more generally used in connection with any globally shared data used by multiple consumers, such as multiple processors which can perform operations, such as read and/or write operations, with respect to the globally shared data.

Described in following paragraphs is a framework that may be used in an SMP (symmetric multiple processor) environment to achieve the synchronization among all the processors for multiple concurrent independent updates of globally shared data. In one aspect, techniques herein utilize a dynamic synchronization mechanism to ensure a disruptive reboot can be avoided while providing for synchronized updates to the global data, copies of the global data and/or other data items dependent on the updated global data. For example, as described in more detail below, the techniques herein may be used to update the configuration data tables available globally (e.g., system wide) such as stored in GM. Additionally, copies of the configuration data tables available locally to each processor and related data structures derived from this configuration data may also be updated in a synchronized manner to ensure a consistent view of all data items based on the updated globally shared data. The synchronization technique may ensure that all of the processors obtain the updated globally shared data item in a uniform and a consistent way and eliminates potential race conditions. Such techniques provide for ensuring that any processing on the processors is not attempting to access configuration data when the configuration data is changing thereby providing exclusive access to a single processor performing the update.

An exemplary embodiment of a data storage system such as described above may include multiple directors or processors such as, for example, FAs, RAs, DAs, and the like.

Figure 3:
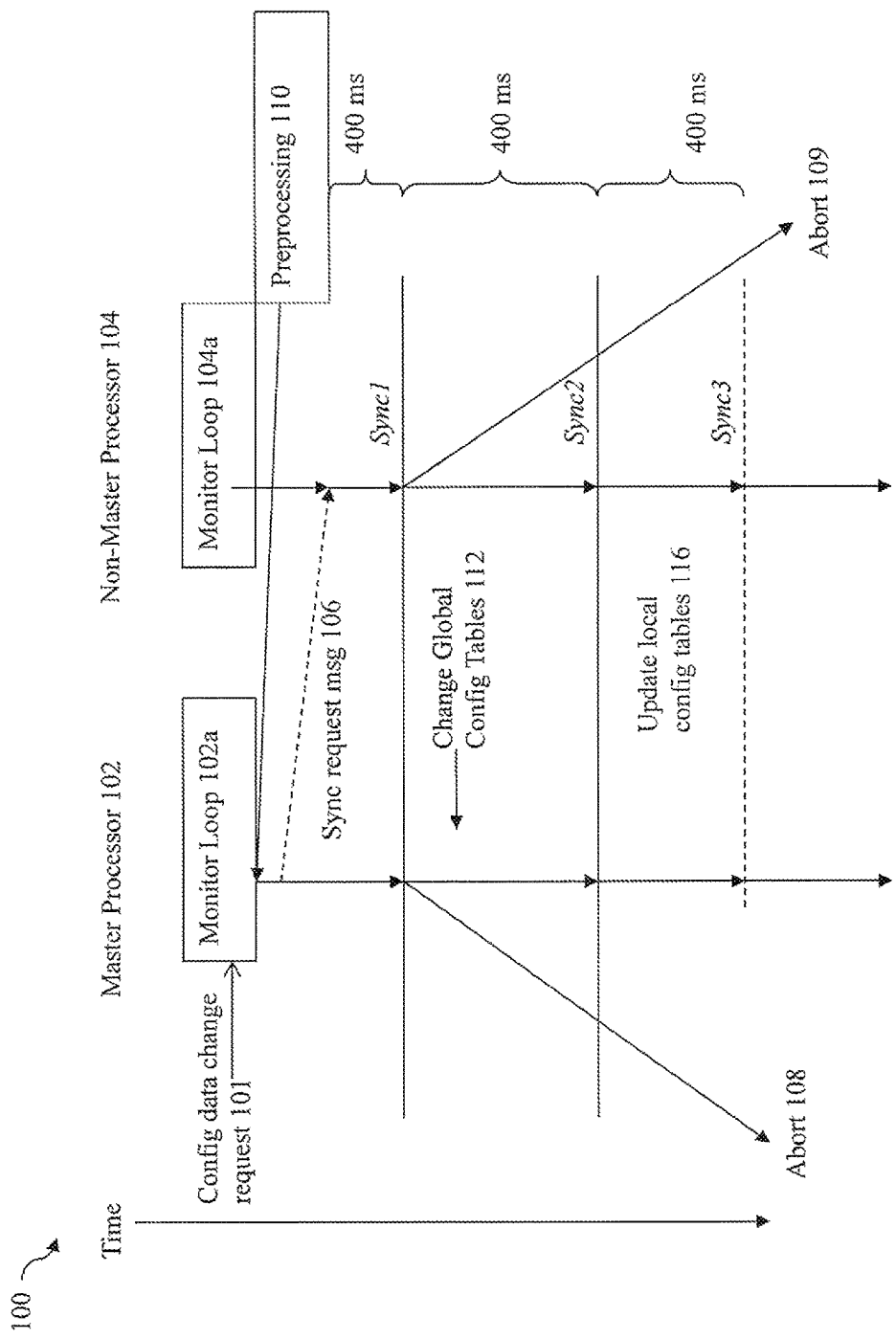
FIGS. 3, 6, 6A and 6B are examples illustrating 3 synchronization points and associated steps that may be used in connection with performing processing for a global data change request.

Referring to FIG. 3, shown is an example illustrating process flow in connection with the techniques herein used to update configuration data available globally (such as stored in GM), used to update configuration data also available locally to each processor, and also used to update other data item, such as data structures, derived from this configuration data using a three level synchronization technique. Note that this example includes three synchronization points but techniques herein may used more generally with a different number of synchronization points as described in more detail below.

With reference to FIG. 3, element 102 denotes a master director or processor and element 104 denotes a non-master director or processor. Although FIG. 3 only includes a single non-master 104 for illustration, there may be multiple non-masters. FIG. 3 illustrates the synchronization points and processing that may be associated with such synchronization points. A configuration data change request 101 may be received by one of the directors (denoted as the master 102) which generally uses the synchronization techniques herein to alert the other directors (denoted as non-masters 104) of the impending change to globally shared data such as globally shared configuration data and then provides for performing the update and also propagating the updated globally shared data in a synchronized manner. The first director 102 receives the request 101 to perform an update to globally shared data, such as the configuration data. For example, the host or data management software may send the request 101 for a change to the configuration data (e.g., define SG, provision LUN or more generally, provision logical devices, modify device characteristics, etc.). The director that receives the request may be referred to as the master processor or master 102 in following paragraphs. The remaining directors or processors which also use the globally shared data and with whom the master communicates to synchronize the globally shared data update may be referred to as non-masters or slave processors/directors 104. Generally, it should be noted that the identity of the master 102 and non-master 104 need not be predetermined but may be rather decided based on the particular processor that receives the request 101 from the host. The processor receiving such a request 101 may be designated as the master 102.

The master 102 may include code embodying a monitor loop 102a which monitors for any received pending requests. Similarly, the non-master 104 may also include code embodying a monitor loop 104a. It should be noted that following paragraphs and figures provide additional detail regarding exemplary data structures that may be used in an embodiment which are updated based on changing states of the master and one or more non-masters. In such embodiments, the monitor loop may also monitor such structures for state changes. Alternatively, an embodiment may use other suitable techniques such as sending messages to communicate such information including state changes.

As described in following paragraphs, the techniques herein perform processing including multiple synchronization points in connection with updating the globally shared data. In one embodiment, messages, communications, and/or state information exchanged between directors may be through writing to, and reading from, global memory accessible to all directors or processors although an embodiment may use other suitable techniques to communicate between processors.

In response to the master 102 receiving request 101 to perform a configuration data update or modification, the master may perform any needed preprocessing 110 and may also send a first synchronization request message 106 (global synchronization request message) from the master 102 to the slaves/other non-master processors 104. Element 110 may generally denote any type of additional preprocessing optionally performed in an embodiment such as may be needed to prepare for the requested configuration change. Such preprocessing 110 may include, for example, checking availability of necessary resources.

The master 102 waits for all other processors to meet or reach a first synchronization point (Sync 1) by having each non-master processor such as by sending an acknowledgement to the master in response to the first synchronization request message 106. The first synchronization request message 106 may be characterized as a request alerting non-master processors about a pending update to globally shared data. When a non-master processor sends an acknowledgement to the master in response to the first synchronization request 106, the non-master is notifying the master of the non-master's commitment to perform further processing in connection with the globally shared data change. The master may wait an amount of time, such as 400 ms (milliseconds), to receive an acknowledgement regarding commitment to proceed from all non-master processors. If such a positive acknowledgment is not received from all non-masters by the end of this time, the first synchronization step associated with the first synchronization point may fail and the master may abort 108 the current processing to update the globally shared data.

If the master receives the above-mentioned acknowledgement from all non-masters, a successful first synchronization point, sync 1, has been completed thereby signaling commitment of all non-master processors to execute the configuration change, or more generally, the change to the globally shared data. The master may send notification to the non-masters regarding completion of the first notification point sync1 indicating that the master has received confirmation that all non-masters commit to performing processing for the requested global data update. If the non-masters also do not receive such notification regarding completion of the first notification point within an expected time period, the non-masters may also timeout and thereby abort 109 processing associated with the request.

Assuming the first synchronization point sync1 has been successfully completed and reached by all processors, the master 102 then proceeds to update the global data 112 between the first and second synchronization points (e.g. Sync 1 and Sync 2 respectively). Subsequent to receiving notification regarding completion of the first synchronization point, the non-master processors may invalidate any local copies of the global data and wait until the master has completed updating the global data. In response to successfully completing the update of the global data, the master processor sends a second synchronization point completion notification to the non-masters thereby notifying the non-masters of the successful update to the global shared data.

As described in more detail in following paragraphs, the master and non-master processors or directors may observe a current state of each other based on processor state information maintained in shared global memory. For example, as described in more detail below in connection with other figures, global memory may include a state table used to determine a current state of each processor and may also include information used to determine whether each processor (master and non-master) is healthy, functional or otherwise not in a failed state.

The second synchronization point, synch2, may be completed or satisfied if the foregoing are true:

1. the master successfully completes the requested update of the global data and sends the second synchronization request to the non-masters regarding completion of the update to the global data.

2. The master has not failed (e.g., is healthy/alive/functional).

3. One or more non-masters have not failed (e.g., are currently healthy/alive/functional).

In connection with criteria 3 above, it is noted that not all non-masters must be healthy/alive/functional. Rather, one or more of the non-masters may have failed/become non-functional or otherwise entered into an unhealthy state at some point subsequent to completing the first synchronization point thereby causing such non-master not to reach synch2.

If one of the non-masters fails to reach synch2 prior to the master sending out notification that the second synchronization point has completed, processing may be performed to ensure that the failing non-master is disabled, deactivated, or otherwise prevented from continuing execution by accordingly signaling the failing non-master. It may be that a non-master is in an unhealthy state but still online or may otherwise still be able to perform some type of processing. For example, the non-master may be executing code related to error or exception handling and may not reach synch2. In this case, it is not desirable to have the unhealthy non-master possibly continue to operate or perform operations that may modify global or other data since such operations may possibly corrupt global data, and the like. In this manner, any failed or unhealthy non-master which does not reach point synch2 may be disabled or deactivated by the master and the remaining master and non-master(s) may continue processing. It should be noted that a processor may not reach a particular synchronization point as may be associated with an execution or processing point in code, for example, if the processor experiences a processing exception or condition which causes the processor's execution flow to vary from normal non-exception processing. For example, an error condition may occur which causes invocation of a handler or special exception processing code. In such cases, the processor may be capable of continuing execution. However, it may be undesirable in such cases of error or exception to have the processor continue execution in connection with techniques herein.

With reference to FIG. 3, sync1 may be characterized as a commit point at which a decision is made as to whether to enter into the transaction to update the global data (e.g., whether to proceed with further processing). The time between sync 1 and synch 2 may be characterized as a time period during which the global data is updated. Sync 2 may be characterized as a delay or coordination point to prevent processors from executing beyond the second synchronization point until updating of the global data has been completed by the master.

At point synch2, there are several possible cases or alternatives in connection with the status of the master and non-masters. As a first case, all of the master and non-masters may be healthy (not failing) and reach the second synchronization point sync2. As a second case, one or more non-masters may fail to reach point sync2. For example, the master may have updated the global data and may wait a time period, such as another 400 ms, for each non-master processor to reach sync2. Otherwise, the master may determine that such non-masters not reaching sync2 within such a time period are nonfunctional or have failed. The master may then actively disable any such non-masters. At this point, the remaining non-masters and the master may continue.

As a third case, the master may fail to reach sync2. Each of the one or more of the non-masters may wait a time period for within which the non-master expects to receive a notification from the master regarding completion of the second synchronization point. If the non-master does not receive the notification within the time period, the non-master may timeout and declare the master to have failed/be unhealthy. In the case that the master fails, the master may be disabled and thereby prevented from further execution. Additionally, processing may be performed to restore the global data to its state prior to any update or modification by the master (e.g., where such modification may occur between the first and second synchronization points).

Information may be maintained in cache, some other portion of global memory, and/or any other suitable memory location regarding what changes have been made to the global data by the master in connection with performing 112. In this manner, an embodiment may store information providing for roll-back or recovery of global data to its state prior to any modification by the master. For example, an existing or current copy of global data may be stored in cache prior to modifying the current copy of global data as stored in global memory. If the master has failed, the current state of the global data may be unknown and one of the non-masters may perform processing to kill/disable or otherwise stop the master from further processing, and then roll-back or return the global data to its state at synch point 1 prior to when any modifications may have been made by the master in connection with the global data change request.

Once sync2 has been satisfied whereby the master and one or more of the non-masters have successfully reached synch2, processing may continue as illustrated by 116 with each processor (master and non-master) refreshing or updating any local copies of global data using the newly updated global data. For example, an embodiment may have each processor maintain its own local copy of the global data which is refreshed using the newly updated global data.

Some embodiment may also have one or more additional synchronization points beyond sync2. For example, an embodiment may delay further processing by any of the master and non-master processors until all processors update their local copies of global data prior to allowing any processor to proceed. In this manner, an embodiment may define a third synchronization point, sync3, whereby each of the master and non-master processors may wait at sync3 until all have completed updating local copies of the global data. As described in more detail below, additional state information may be maintained in global memory indicating a status of the local update by each processor. Thus, each processor may accordingly update its own local update status in global memory and also view a local update status of every other processor to determine when synch3 point has been reached. More generally, as described below such as in connection with FIG. 5, each processor may write information in a portion of GM regarding its own state which is visible to all other processor.

As described above, each processor may wait a time period for all other processors to indicate that they have completed their local updates of copies of global memory. After such a time period has expired and a first processor has not set its local update status to indicate completion, other processors may timeout and assume that the first processor has failed or otherwise was not able to complete its local update. Appropriate action may be taken responsive to detecting failure of the first processor to complete updating its local copy of the global data depending on the particular reason for the third synchronization point. For example, if a processor fails to update its local copy of the global data, processing may be performed to rebuild or reconstruct all local structures. Other embodiments may perform other processing such as for example, the failed first processor may be disabled.

Upon all processors completing updating any local copies of the global data using the newly modified global data, the third synchronization point has been completed and all processors may continue. Otherwise, if one or more of the processors have failed to complete any local updates as noted above within the predetermined amount of time, an action such as disabling the failed processor, rebuilding or restoring the local copy of the global data in another way, and the like, may be completed prior to allowing the other processors to continue.

It may be that certain types of global data require such synchronization using the third synchronization point so that all processors use the same copy of global data (or otherwise have any derived locally stored data items dependent on the changed global data recalculated). For example, a data structure may be included in globally shared data that is modified by the master. The modified structure may denote an owner of an object (e.g., owner of an object may be changed from one processor or director to another processor or director) or a particular relationship whereby it is required that each processor operate using a local copy of the global data having the same consistent value. For example, a global structure or data item may indicate which DAs service I/Os for which physical devices. It may be required that all processors or directors operate using a same consistent view of such information as reflected in a local copy of the global structure or data item. In this case, a third synchronization point may be used to delay all processors until the last update to the global data item has been incorporated into the local copies used by each of the processors. The foregoing are only some examples of the type of updates to global data that may warrant use of a third synchronization point as just described. To further extend use of techniques herein, an embodiment may also provide for fourth and even additional synchronization points. Each such synchronization point may require updating of one or more local data items possibly dependent on the changed globally shared data (or a data item updated by processing of a previous synchronization point) prior to allowing any of the processors continue execution beyond the synchronization point. The one or more local data items may include, for example, a copy of the newly updated global data or a data item that is derived from (or otherwise dependent upon) the updated global data.

An embodiment in accordance with techniques herein may utilize one or more synchronization points. More generally, an embodiment may use between one and N synchronization points (N being an integer greater than or equal to 1) depending on the number of additional dependent steps subsequent to synchronization point one requiring synchronized participation by multiple processors for updating data items dependent on the modified global data (e.g., a local copy of modified global data, a local data item derived from the modified global data, or a local data item dependent on another derived data item updated in processing of a previous synchronization point). For example, with reference to FIG. 3, an embodiment may have additional synchronization points between Sync1 and Sync2 and/or between Sync2 and Sync3 as represented in FIG. 3. Additionally, an embodiment may also include additional synchronization points after Sync3 as in FIG. 3.

What will now be described is a further example in which techniques herein may be utilized in connection with multiple tiers or levels of data items which may be modified in a synchronized manner based on the initial update to the globally shared data item(s) as may be stored in GM. In this manner, an appropriate number of synchronization points and associated steps may be used as needed depending on the number of synchronized updates desired.

Figure 4:
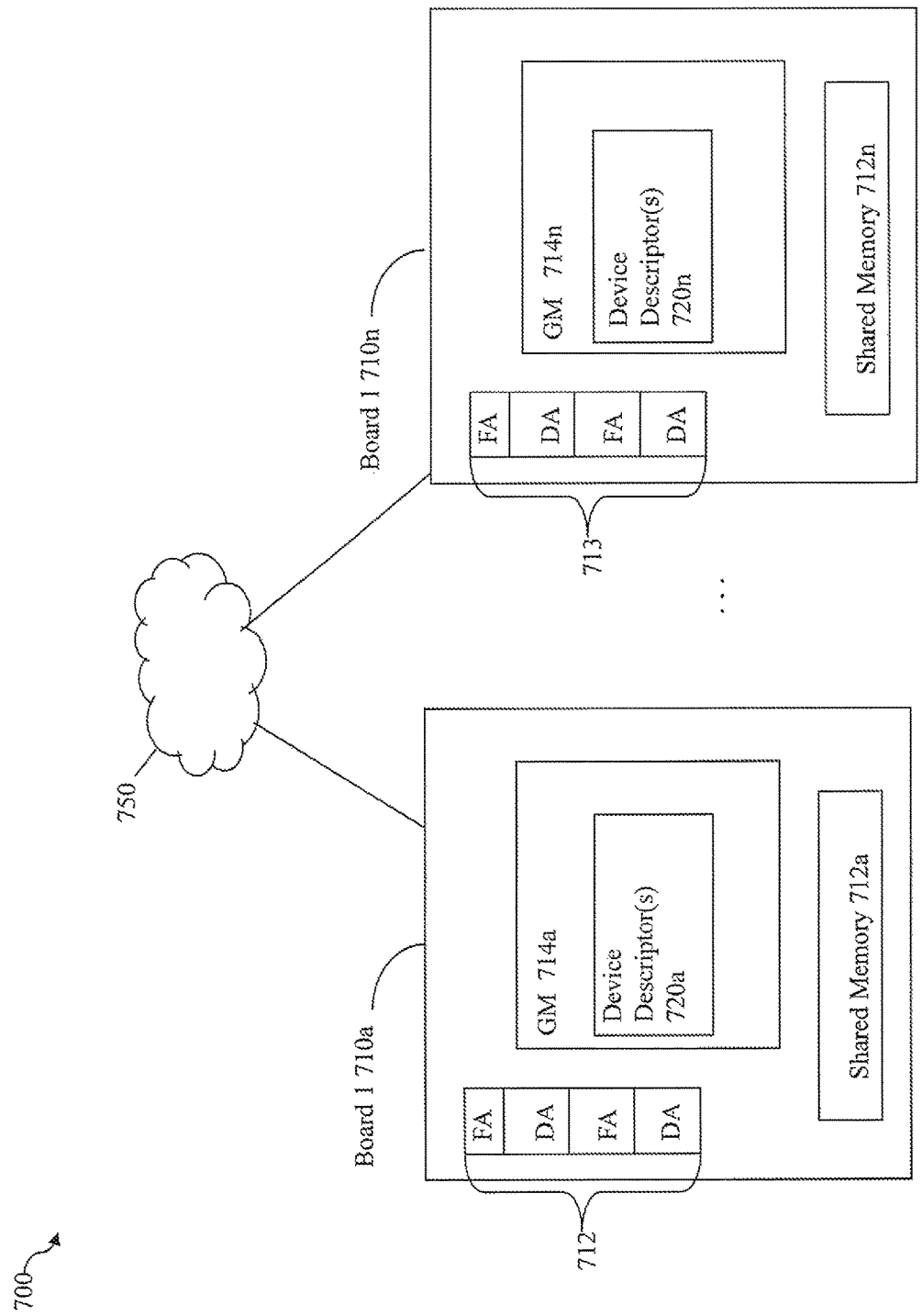
FIGS. 4, 4A and 4B are examples illustrating distribution of components and global memory portions on a plurality of boards as may be included in a data storage system in accordance with techniques herein.

Referring to FIG. 4, shown is an example of director boards as may be included in an embodiment in accordance with techniques herein. In this example 700, the data storage system may include a plurality of director boards 710a-710n. Each of the boards 710a-710n may be a physical board including components thereon as illustrated. In particular, each of the boards may include one or more directors and a portion of global memory so that global memory may be distributed across multiple director boards. For example, board 710a may include a plurality of directors 712 of the same or different director types (e.g., all DAs, all FAs, or both DAs and FAs illustrated directors of different types). Board 710a may also include a portion of global memory (GM) 714a. Stored in GM 714a may be information, such as device descriptors 720a, accessed and used by directors and other components of board 710a as well as other components of other boards, such as 710n. The boards 710a-710n may communicate over a fabric 750 to access global memory. The fabric 750 may include, for example, a switch and connections between the switch and boards 710a-710n. Device descriptors 720a and 720n as stored in global memory portions 714a and 714n, respectively, may contain information used by an FA, DA or other director when performing I/O operation processing directed to a particular LUN. For example, device descriptor information may identify whether the device is online or ready. The device descriptor information may also include information for each track of the device such as, for example, whether data from the track is in cache, whether data for the track stored in cache is write pending, and the like.

In connection with the foregoing, a device descriptor for each logical device (e.g., such as each LUN) may be stored within global memory of the data storage system. However, since the global memory is distributed across multiple director boards, different device descriptors stored in global memory may physically reside on portions of global memory located on different director boards. The device descriptors may be an example of configuration data that is a globally shared data item that may be updated by any of the directors on any of the boards.

Also illustrated in the example 700, each of the boards 710a-710n may include a respective portion of shared memory 712a-712n. Each portion of shared memory located on one of the boards may be memory used by any director located on the same board as the shared memory portion but not used by other directors not located on the same board. For example, any of the directors of 712 on board 710a may access and use shared memory 712a. However, a director of 713 on board 710n may not use shared memory 712a. Additionally, each of the directors on a board may have a portion of director local or private memory (not illustrated) used only by the particular director. The shared memories and/or director local memories may store a copy of the global data item, or portion thereof. The shared memories and/or director local memories may store other data items which may be dependent or, or determined using, the modified globally shared data item and thus require updating in response to the modification to the globally shared data item.

Accordingly, techniques described herein may be used to coordinate and synchronize updating the globally shared configuration data stored in GM and also updating copies of the configuration data (or other data items derived from the updated globally shared configuration data) that may be stored in the shared and local (director private) memories.

Figure 4A:
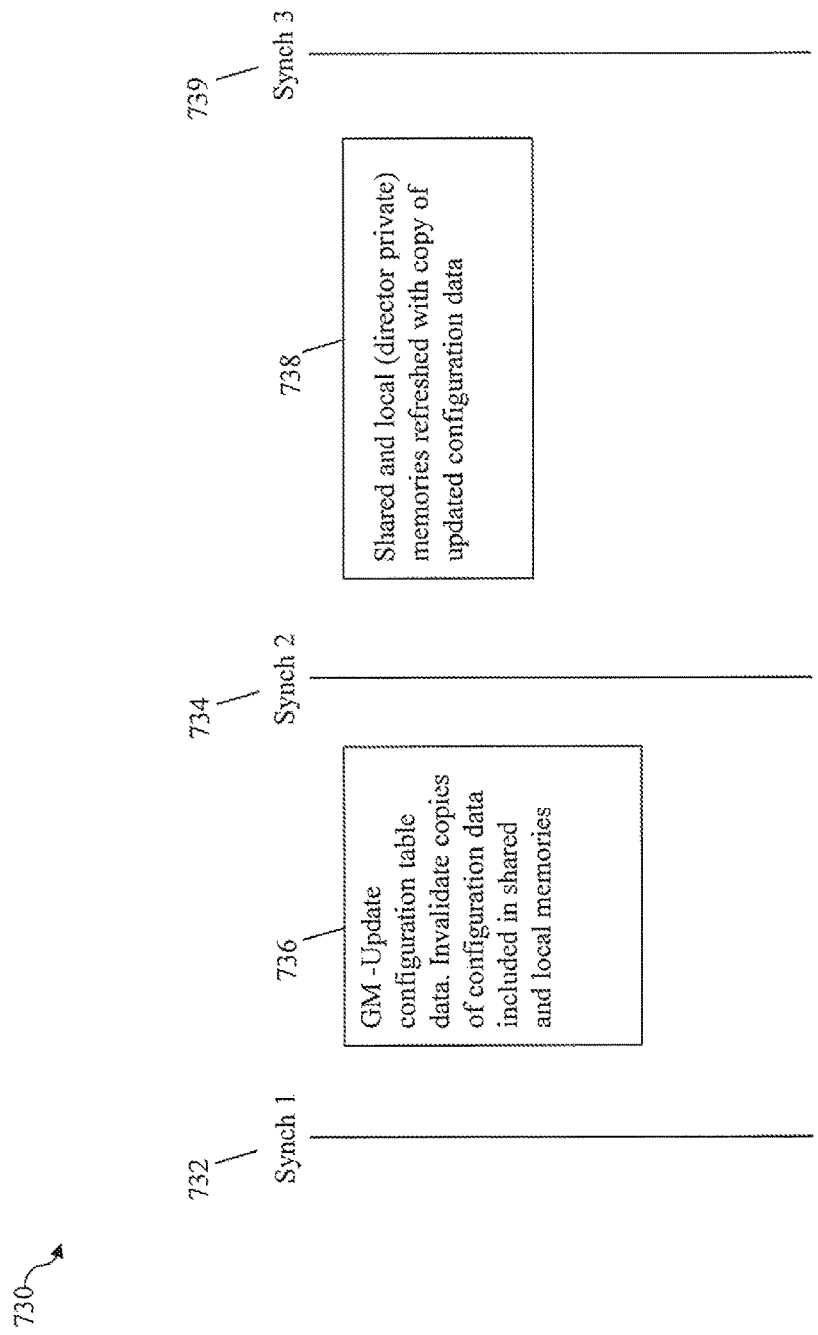

With reference now to FIG. 4A, shown is an example illustrating synchronization points as described above that may be used in connection with synchronizing updating the globally shared data, the configuration data, stored in GM and also copies of the globally shared data. The example 730 includes a first synchronization point synch1 732, a second synchronization point synch 2 734 and a third synchronization point synch3 739 as described above. A first director on one of the boards, acting as the master processor or director described above, may receive a request to update a portion of the global configuration data stored in a portion of GM on one of the boards. In connection with synchronizing updates to the GM including the globally shared configuration data, a first synchronization point synch1 732 may be defined as described elsewhere herein as a commit point at a first point in time. Synch1 may be completed or reached when all directors have committed to proceeding with the global data update request. Subsequent to synch 1 732, the master may update the configuration data in the GM and the shared and local copies of the global configuration data (as stored in shared and director local memories) may be invalidated as illustrated by 736. The second synchronization point synch2 734 may be reached and then followed by processing of 738 where both the shared memories on each of the boards and the local (director private) memories are refreshed with copies of the updated configuration data. As described elsewhere herein, state information visible to all directors may be updated as shared and director local memories are refreshed to indicate that the shared and local memories are now valid. All directors (master and non-master(s)) wait until point synch3 is reached by all other directors prior to proceeding further. In this manner, no directors may proceed until all copies of the globally shared data item and/or other data items derived from the globally shared data item as may be stored in local and/or shared memory by all directors have been updated. In one embodiment, point synch3 739 may be determined by each director observing the state information regarding the other directors. In this example 730, three synchronization points are illustrated and used in coordinating updating of the globally shared data item and copies thereof, or other data items dependent on the updated globally shared data item. Although copies of the globally shared data item and data items derived from such global data items (e.g. the configuration data) may be stored in both shared and local memories, the example 730 provides for synchronizing updating of both shared and local memories with the updated configuration data in connection with the third second synchronization point 739. In this manner, the third synchronization point may be used, for example, where a copy of the global data item may be stored in shared memory and local memories of the directors may include data items derived from such global data items modified by the request. The third synchronization point may be used to hold all directors at the processing point synch3 until all directors have completed updating their local memories.

Figure 4B:
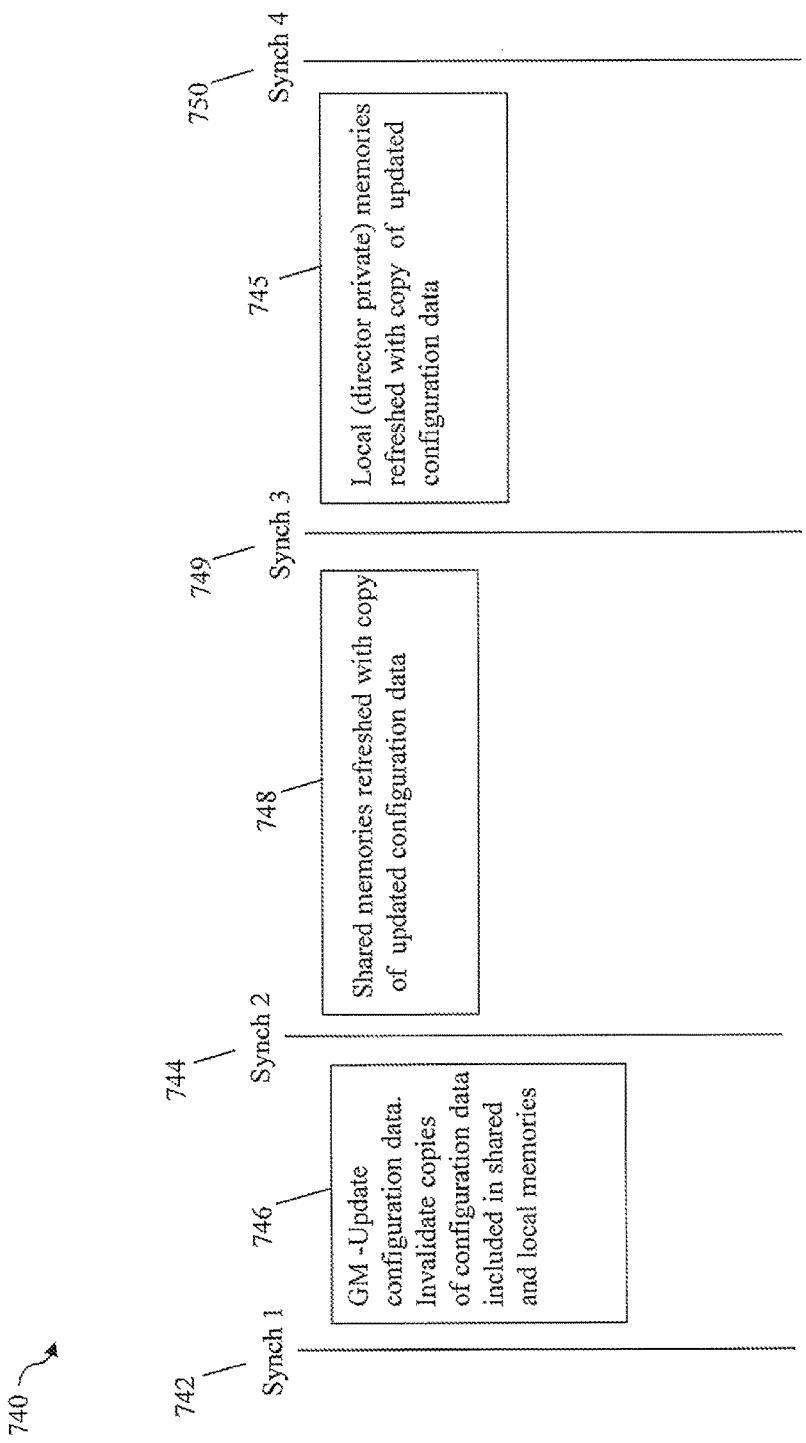

As a variation to that as described above in connection with FIG. 4A, reference is now made to FIG. 4B. In the example 740, elements 742, 746, and 744 are respectively analogous to 732, 736 and 734 of FIG. 4A. As illustrated by 748, processing to update all shared memories 712a-712n with the updated configuration data may be performed in a single synchronized step after reaching the second synchronization point synch2 744. Element 749 illustrates a third synchronization point synch 3 which is reached once the shared memories of the boards have been updated. As illustrated by 745, processing to update all local or director private memories with the updated configuration data, and/or any data items derived therefrom, may then be performed in a synchronized step after reaching the third synchronization point synch 3 743. Element 750 illustrates a fourth synchronization point synch 4 which is reached once the director local memories of the boards have been updated. Each director may wait at synch4 750 until all other directors have updated their director local memory with any needed changes in response to the updated globally shared data item.

Consistent with description elsewhere herein, an embodiment may utilize a timeout or expiration period with each synchronization point whereby each director waits for criteria for that synchronization point to be satisfied within a timeout period. After such a time period, any director not reaching the synchronization point may be determined to have failed or otherwise be in an unhealthy state and appropriate action may be taken.

Thus, FIG. 4B illustrates a variation of FIG. 4A whereby the shared memories may all be updated subsequent to reaching a second synchronization point synch2 744 and then the local or director private memories may be updated subsequent to reaching the third synchronization point synch 3 749. Each director may then wait to proceed with further processing until all directors reach point synch4 750 (or otherwise timeout) thereby allowing for a synchronized and consistent view of data items which are either copies of the modified global data item or may otherwise be dependent on the modified global data item. Consistent with other description herein, the shared memories in 748 are not updated until after the configuration data in GM has been updated, and the local memories in 745 are not updated until after all shared memories have been updated. Thus, techniques herein may be used to provide for achieving updates to globally shared data followed by one or more different synchronization points in time at which further coordination and synchronization of data updating is performed for data items dependent on the globally shared data updates.

In one embodiment using the techniques herein, the configuration data may be included in one or more tables which are the globally shared data item(s) modified by the master. As described elsewhere herein, processing may be performed to provide for rollback or restoration of the modified configuration tables to a previous state prior to modification by the master if the master fails or otherwise encounters an unrecoverable exception since in such cases, the state of the configuration tables is unknown and may be corrupted or otherwise remain in an inconsistent state. In such an embodiment, information regarding changes made to the configuration table may be maintained. The identity of the modified table(s) of configuration data and records of the table which are modified by the master may be saved to a buffer in GM. The table of configuration data prior to modification may be cached, for example, in a portion of shared memory in which case the identity of the modified records may be used to restore such records from the cached copy of the configuration data in the event the master fails. It may alternatively be that the table of configuration data is not cached in shared memory. In this case, the record of the configuration data table prior to modification may be saved in the buffer in GM. In the event of a failure during the updating of the globally shared copy of the configuration data, previously saved information may be read from the GM buffer and the appropriate record(s) restored from either the cached copy in shared memory or from records of the GM buffer.

In connection with the foregoing for FIGS. 4, 4A and 4B, it should be noted that the shared memory of a board may be updated by the first director of that particular board to arrive at synch2. Therefore, a subsequent director on the same board will not then update the shared memory copy. Each director may also update its own local private copy of the global data item or any other local data items dependent on the updated globally shared data.

Additionally, in connection with above-mentioned description, prior to reaching point synch2, copies of global data item stored in shared memory and/or director local memory are invalidated. The state regarding the shared memory as invalid or valid may be indicated by state information maintained on each board where each of the shared memory portions is located.

To summarize some points in connection with processing above, steps include completing synch1, updating the globally shared data item in GM, invalidating shared and local memory copies (e.g. invalidate copies of global data item such as by accordingly modifying state information), and sending appropriate notifications between master and non-master (as described below) indicating that synch2 is completed. In connection with processing between synch2 and synch3 related to refreshing shared and local memories with updated configuration data, the first non-master director of each board to view the invalid state of the board's shared memory may update the board's shared memory with the new copy of the global data item and set state information to indicate that board's shared memory copy is now valid. The first director also updates its local memory which may contain any of a private copy of the global data item and/or one or more data items derived from the global data item. A second subsequent non-master director on the same board as the first director may perform processing similar to that as described above for the first director. In this case, the second director will note from the state information that the board's shared memory is valid and not perform processing to update the shared memory. In connection with the example of FIG. 4A, the processors may wait at a third synchronization point synch3 until all the shared and local memories have been updated. In contrast, with the example of FIG. 4B, the processors may wait at the third synchronization point synch3 until all the shared memories have been updated. Subsequently, the local memories (director private) may then be updated and the processors may wait at a fourth synchronization point synch4 until all such local memories are updated.

Figure 5:
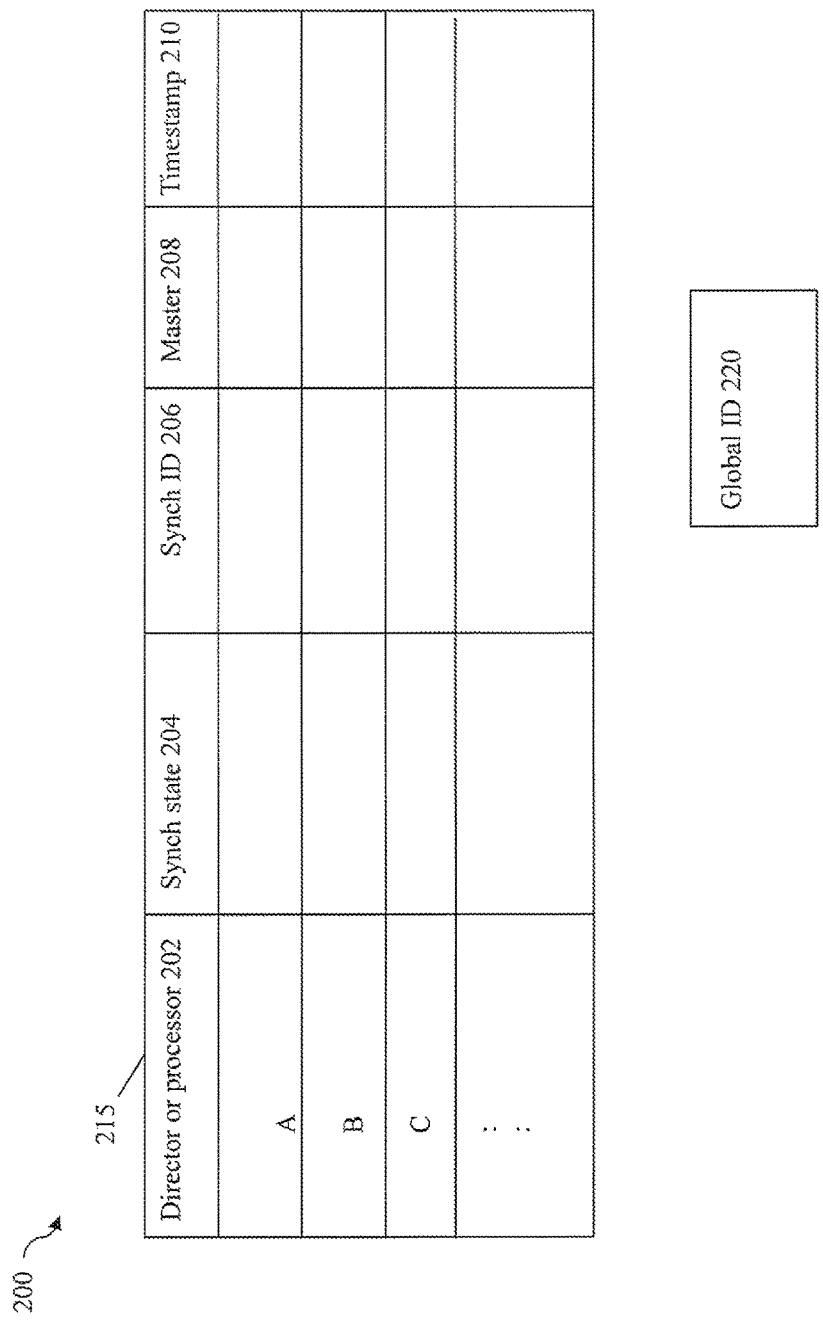
FIG. 5 is an example of information that may be stored in global memory and used in an embodiment in connection with techniques herein.

Referring to FIG. 5, shown is an example of information that may be maintained in GM for use in connection with techniques herein. The example 200 includes a table 215 of director or processor state information and a global identifier (ID) 220.

The table 215 includes a row of state information for each director or processor identified in column 202. Generally, a row of table 215 identifies a director or processor 202, a synchronization (synch) state 204, a synch ID 206, a master 208 and a timestamp 210. For a row of 215 having a particular processor identified in column 202, the synch state 204 identifies the current state of the processor, the synch ID 206 includes an identifier denoting the synchronization point or step for which processing is currently being performed to try and achieve, the master 208 identifies which of the processors is the current master, and the timestamp 210. In an embodiment the timestamp may represent the time of the particular synch point denoted by synch ID 206. The timestamp 210 may be updated by the master in the master's entry of the table 215 when signaling the non-master(s) (e.g., when the master updates the synch ID of the master's entry in the table 215). The timestamp may be used in an embodiment, for example, in connection with determining lapsed time or differences from a current time such as when determining whether a time out period has expired.

The state information as maintained in a row of the table 215 may be written by the director or processor as identified in column 202 of the row. Thus, table 215 presents the state of the processor or director from the view of the processor or director. In one embodiment, state information of 215 used in connection with synchronization techniques herein may be stored in a portion of GM which is accessible to all directors. In this manner, one director may update its own state information in an associated row which may then be read by all other directors. Similarly, that one director may also view state information regarding the other directors as the state of each of the other directors may change (e.g., as each of the other directors may perform processing and reach different synchronization points).

Column 204 may identify one of a set of predefined states denoting a current state of the director. In one embodiment, different synch states may be indicated for a master and for a non-master. Synch states for each master director may be any one of: sync_start, sync_sync, and sync_abort. Synch states for each non-master director may be any one of sync_empty and sync_ready. Details regarding these possible states and other elements of FIG. 5 are provided in following paragraphs below.

In an embodiment, multiple change requests may be received by multiple directors. Therefore, an embodiment may use a global ID (identifier) 220 associated with each request to change globally shared data, such as the configuration data, to distinguish between such change requests. The global ID may be a unique id associated with each request denoting a particular change request to globally shared data. Global ID may be a variable having a current value stored in GM which is incremented under lock by a particular director to obtain the next Global ID for a new change request. The Global ID may be updated by any of the directors when such director, as a master, receives a request to update a globally shared data item. An embodiment may associate a number sequence with Global ID such as, for example, an increasing sequence of integers such that each next number in the sequence is unique.

Since there may be multiple concurrent change requests and associated multiple global IDs, it may be desirable to generate synchronization point identifiers (synch IDs) that vary with each of the global IDs. An embodiment may therefore distinguish a first synchronization point (synch 1) associated with a first global ID from another first synchronization point synch1 associated with a second different global ID and change request. Using the global ID identifying a particular change request for updating a globally shared data item, an embodiment may generate a synch ID for each synchronization point associated with a step in the change request processing. In one embodiment, N may represent a total number of synchronization points for a single global ID. A synch ID for a step or synchronization point "i" (i>1 and i<N+1) for the global ID may be calculated as:

$$\text{Synch ID } i = (\text{global ID} * N) + i \qquad \text{EQUATION 1}$$

As described in more detail below, the master may obtain the Global ID for a received configuration change request. With reference back to FIG. 3, the synch request message 106 sent to the non-masters may identify the master and also include the Global ID. Thus, each of the master and non-masters may calculate a value for the current synch ID based on Global ID. When performing processing for a particular step to achieve a particular synchronization point, each processor may update its own state information to identify what it believes are the current master (in 208) and current synch ID (in 206). In this manner, each processor may perform processing including validity checks for ensuring that all processors attempt to synchronize with the same synch ID.

Each processor may update its sync state 404 to identify a current state of the processor based on the processor's current role of master or non-master. Synch states for each master (as written to the master's entry in the table) may include:

sync_start—written by master along with synch ID identifying current synch ID in progress (working toward satisfying criteria/reaching the synch ID). The master writes the foregoing synch ID and sync_start state to master's entry in the table. If sync_start is never written, then the master failed. Each non-master waits or looks for the master to update its state to sync_start serving as one signal or notification described below in more detail.

sync_sync—The master updates its state to sync_sync to indicate that criteria for the currently identified synch ID has been met thereby signaling transition for proceeding with processing toward the next synchronization point (if any). The master updates its state to sync_sync in response to receiving a sync_ready from one or more non-masters.

sync_abort—The master updates its state to sync_abort to indicate that the currently identified synch ID and associated global ID change request has been aborted.

Synch states for each non-master director may be any one of:

sync_empty—written by non-master to initialize its own slot or state information of the table.

sync_ready—Written by non-master in response to the master updating its state to sync_start and upon the non-master completing any required processing associated with a particular synchronization point.

What will now be described are more detailed steps performed in an embodiment using the information of FIG. 5 and the above-mentioned processor synchronization states. FIGS. 3, 4, 4A and 4B provide a general description of the synchronization techniques herein. An embodiment may further use any suitable means for communicating various aspects of state information between the processors. One embodiment may use the particular information also described in more detail above such as illustrated in FIG. 5 and also using the global ID, synch ID and different synch states described above. Thus, following paragraphs set forth additional description and details of such an embodiment using the information of FIG. 5 and also using the global ID, synch ID and different synch states described above.

Generally, the different synch states and processing for each synchronization point may be summarized as follows: For the master:
1. If this is the first synchronization point, broadcast request to all non-masters and wait for all non-masters to acknowledge reading of result from previous sync by writing sync_empty to their respective table entries.
2. Clear or initialize master entry in table for next synchronization point.
3. Master writes sync_start (with respective synch ID) to the master's entry in the table.
4. Wait for non-masters to write sync_ready to their respective entries in the table.
5. For first synchronization point, master writes sync_sync or sync_abort to its table entry depending on whether all non-masters reported sync_ready within timeout period. For synchronization points other than the first, master writes sync_sync to its table entry if one or more non-masters report sync_ready within timeout period, and otherwise master writes sync_abort. As described elsewhere herein, for first synchronization point, all non-masters write sync_ready or request is aborted by master writing sync_abort to its table entry.
6. For any synchronization point after the first synchronization point synch1, if any non-masters failed to write sync_ready to their table entries, such non-masters are disabled or deactivated.

For each Non-master:
1. Non-master writes sync_empty to its table entry.
2. Check for sync_abort to be written to the table entry from the correct master with the correct synch ID. If found, non-master assumes it has reached synchronization point after timeout period and aborts.
3. For each synchronization point, expect master to write sync_start with correct synch ID to the master's table entry.

4. If Master fails to report sync_start: For first synch point: Abort. For any synch point after 1$^{st}$ sync: Disable Master.
5. Non-master writes sync_ready to its table entry once it has viewed correct master writing sync_start with correct synch ID and completed any processing for the synchronization point.
6. Non-master waits for master to write sync_abort or sync_sync.
7. If Master fails to write sync_sync within time out period: For 1$^{st}$ synch point: Abort. For any sync after 1$^{st}$ synch point: disable or deactive master.

Additional details regarding the various synch states that may be used in connection with exemplary processing that may be performed in connection with different synchronization points is described in more detail below.

Figure 6:
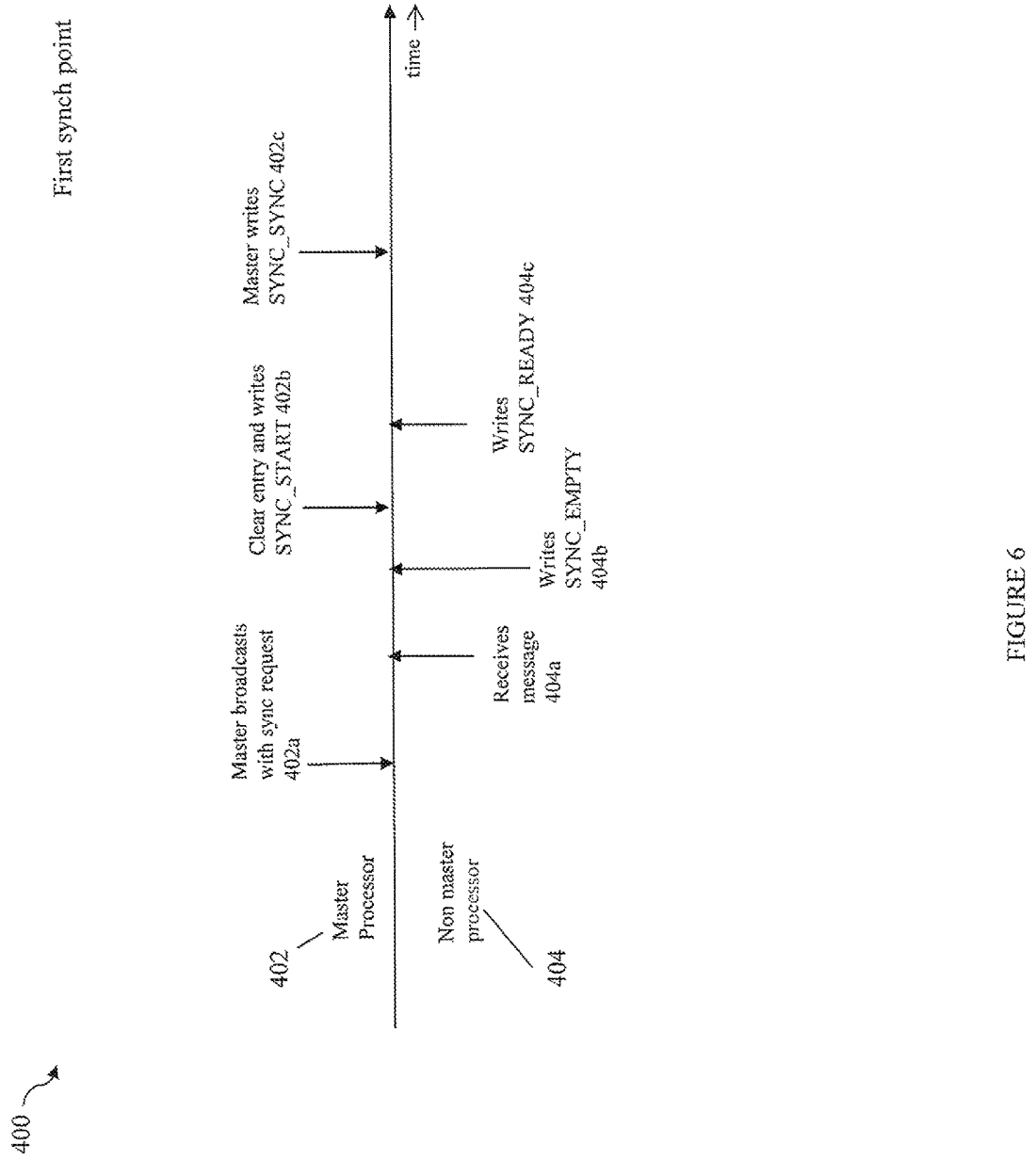

Referring to FIG. 6, shown is an example illustrating state information and processing performed by the master and non-master in connection with a first synchronization point in an embodiment in accordance with techniques herein. The example 400 illustrates processing performed in a time sequence for the first synchronization point, synch 1, with the top portion including processing and state information for the master processor 402 and the bottom portion including processing and state information for the non-master processor 404. In connection with the examples of FIGS. 6, 6A, and 6B, the various sync states along with other information described may be written to and read from the table of FIG. 5 thereby serving as the means by which the directors communicate their states to the other directors.

The change request/sync request for updating globally shared data is broadcast from the master to one or more non-masters in 402a. In response to receiving 404a the change request message from the master, each non-master then updates its own information in the table of FIG. 5. The non-master updates its corresponding row in the table 215 of FIG. 5 so that its sync state (e.g., column 204 as illustrated in FIG. 5) is set to sync_empty in 404b. Additionally, the non-master may calculate the synch ID expected based on the global ID of the received in the change request of 402a, and then initialize column 206 synch ID to be the expected calculated synch ID and the column 208 master to identify the master processor or director (consistent with the master identified by the sync request of 402a). As noted above, the request received in 402a identifies both the global ID and the master. Therefore each non-master expects the entry in the table for the particular master identified by the request 402a to be accordingly updated with the sync_start state and the synch ID corresponding to the first synchronization point for the global ID. Each of the non-masters may calculate the expected synch ID for the current global ID and then view the particular master's row of the table for information used in connection with synchronization to ensure that the master has written the expected synch ID. The foregoing may be performed as a validation check by each non-master. If the information in the master's entry of table 215 of FIG. 5 does not contain the expected synch ID, the non-master may cease synchronization processing in connection with the current change request for global ID. The synch ID of the master's entry in the table identifies the current synch ID which is currently trying to be satisfied. It should be noted that more generally, each of the non-masters may perform the above-mentioned data validation processing to ensure that the master's entry includes the correct synch ID in connection with any/all synchronization points described in following paragraphs.

In step 402b, the master clears its entry in the table and updates its state to sync_start. Each non-master waits or looks for the master to update its state to sync_start in 402b with the correct expected synch ID. In response to the master setting its state to sync_start in 402b, the non-master updates its own state to sync_ready in 404c. Once the master waits the predetermined amount of time for the first synchronization point synch ID, the master may examine the state information to ensure that one or more non-masters have accordingly set their own state to sync_ready thereby signaling commitment from the non-master. For those non-master directors which have not set their state to sync_ready within the predetermined amount of time, the master may presume that such directors have failed or otherwise cannot commit to performing the change request to update a globally shared data item. If the master fails to update its state to sync_start or sync_sync, the non-masters may presume the master has failed. If all non-master directors fail to commit by setting their state to sync-ready 404c, the current change request to update shared global data may be aborted as indicated by the master updating its state to sync_abort. Similarly, if the master fails to set its state to sync_start and then sync_sync, the current change request to update shared global data may be aborted.

Assuming the master and non-masters have not failed in connection with the first synchronization point processing of FIG. 6, the master updates its state in 402c to sync_sync thereby indicating that the criteria for the first synchronization point of the current global ID has been satisfied and processing may transition or proceed to further processing associated with achieving any next synchronization point for the current global ID.

In connection with the foregoing for the first synchronization point, it should be noted that the master may also perform additional checking as part of validation as a requirement/precondition to setting its state to sync_sync 402c. In one embodiment, the master may require that each non-master to which a sync_request was sent in 402a have its state set to sync_ready as noted above. Additionally, each non-master may write additional state information to its entry in the state table 215 of FIG. 5 indicating which director the non-master understands or acknowledges as the current master and also what is the expected synch ID as calculated locally or independently by the non-master based on the global ID of the received sync_request of 402a. The master may examine such additional information regarding the acknowledged master and expected synch ID as written by each non-master to its state information in GM. As a precondition or requirement for the master to set its state to sync_sync in 402c, the master may require that each non-master's state information identify the master and correct synch ID as well as the sync_ready state. The foregoing may be performed in connection with each synchronization point although only explicitly mentioned in connection with the first synchronization point.

Figure 6A:
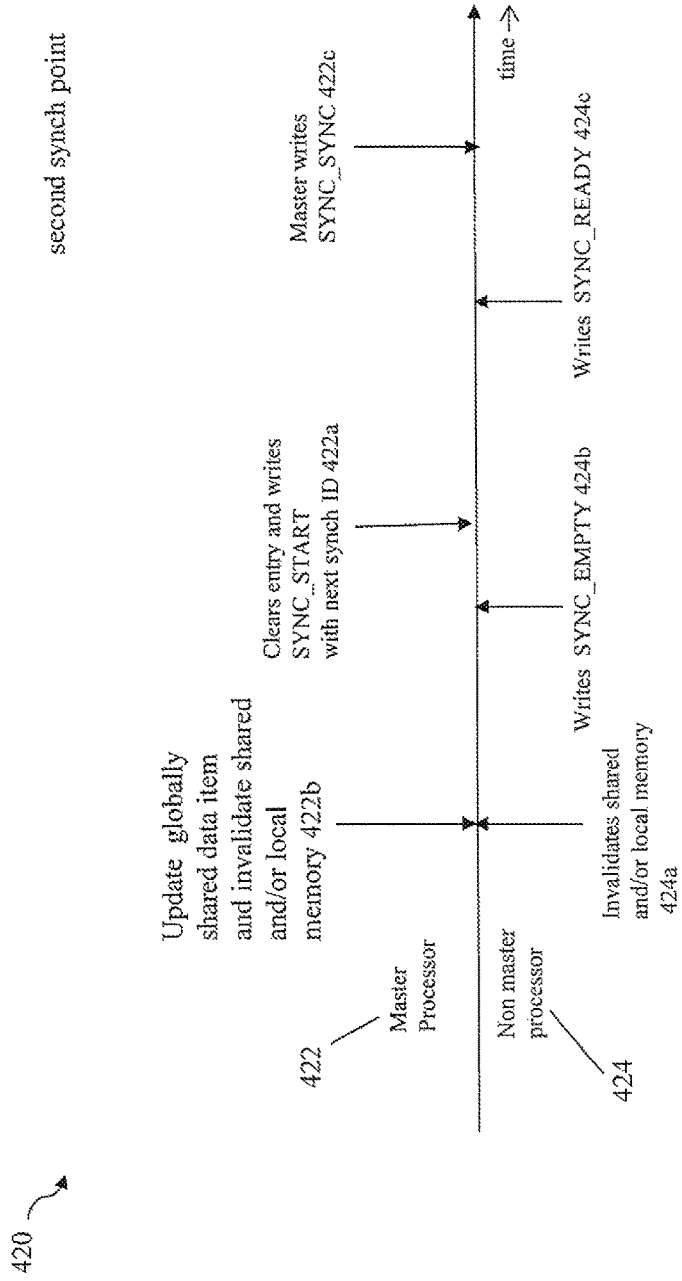

Referring to FIG. 6A, shown is an example illustrating state information and processing performed by the master and non-master in connection with a second synchronization point in an embodiment in accordance with techniques herein. The example 420 illustrates processing performed in a time sequence for the second synchronization point, synch 2, with the top portion including processing and state information for the master processor 422 and the bottom portion including processing and state information for the non-master processor 424.

In 422b, the master updates the globally shared data item and then performs processing to invalidate shared and/or its local memory. The master, like any other director, may perform processing as described herein to invalidate the shared memory of the board including the master and also its own director local memory (e.g., such invalidation invalidates copies of global data items and/or content derived from such global data items). In 422a, the master updates its state information by writing sync_start in the synch state field and also updates the synch ID to correspond to the second synchronization point, synch 2, for the current global ID. It should be noted that the master updating the globally shared data item and shared and/or local memory as in 422b may generally be performed between synch1 and synch2 and is part of the processing of the second synchronization point which is being synchronized with the other directors performing processing in 424a (noted below).

In response to a non-master viewing the master's information to reflect the completion of synchronization point 1 (e.g., by the master writing sync-sync as in 402c of FIG. 6), the non-master may perform processing of 424a which includes invalidating shared memory (on the board including the non-master if not already invalidated) and its director local memory. Such invalidation may include invalidating copies of global data items affected by the request which are stored in the shared and/or local memory. Such invalidation may include invalidating other data items which are dependent on the updated or modified global data items affected by the request whereby such data items are stored in the shared and/or local memory. In step 424b, the non-master writes synch_empty to its entry in the table. In step 424c, the non-master updates its state to sync_ready once the shared memory and/or local memory has been invalidated and after having viewed the master's entry including the sync_start state with expected synch ID as a result of step 422a.

Once the master waits the predetermined amount of time for the second synchronization point, the master may examine the state information in the table 215 to ensure that one or more non-masters have accordingly set their own state to sync_ready. For those directors which have not set their state to sync_ready (as in 424c) within the predetermined amount of time, the master may presume that such directors have failed and take appropriate steps as described herein (e.g., to disable each such director). If the master fails to update its state to sync_start or sync_sync, the non-masters may presume the master has failed and may take appropriate steps as described elsewhere herein (e.g., to disable the master, rollback any changes made to globally shared data, and the like depending on the particular synch ID). Assuming the master and one or more non-masters have not failed (as indicated by the non-masters setting their state to sync_ready 424c), the master updates its state in 422c to sync_sync thereby indicating that the criteria for the second synchronization point of the current global ID has been satisfied and processing may transition or proceed to further processing associated with achieving any next synchronization point for the current global ID.

Assume for purposes of illustration that a third synchronization point is required as described in connection with FIG. 4A to delay processing of all directors at the third synchronization point until the last director has completed updating its local memory based on the changed global data item in 422b.

Figure 6B:
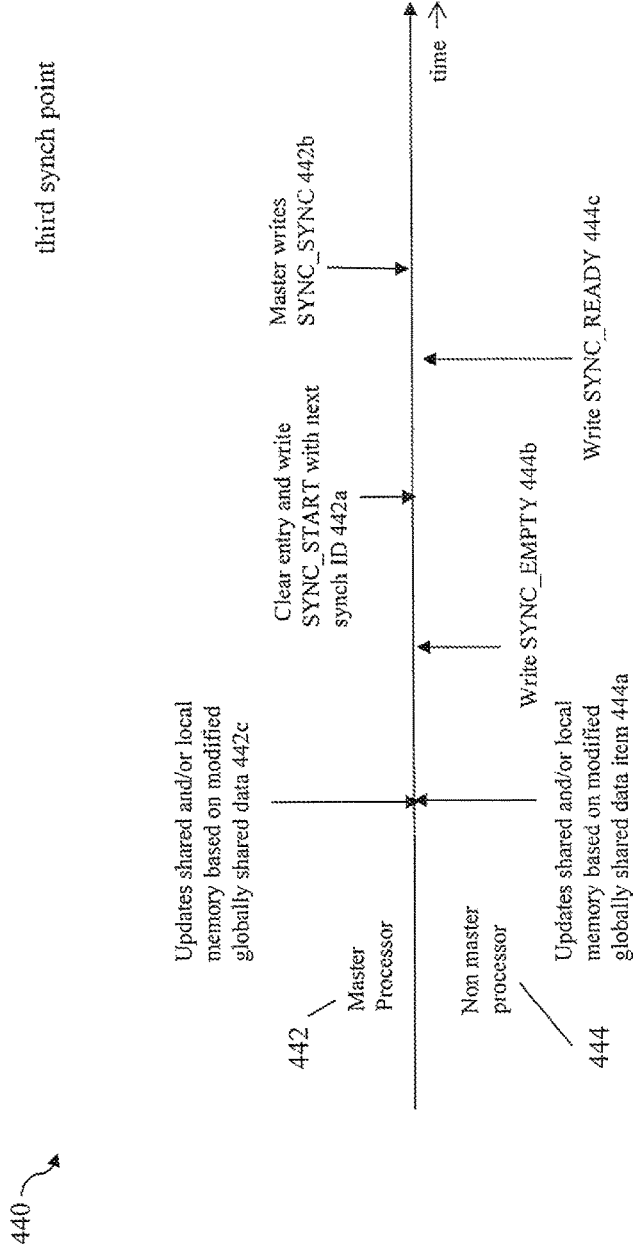

Referring to FIG. 6B, shown is an example illustrating state information and processing that may be performed by the master and non-master in connection with a third synchronization point in an embodiment in accordance with techniques herein. The example 440 illustrates processing performed in a time sequence for the third synchronization point, synch 3, with the top portion including processing and state information for the master processor 442 and the bottom portion including processing and state information for the non-master processor 444.

In 442c, the master performs processing to update the shared memory of the board containing the master and also update its director local memory based on the modified global data item. As part of step 442b, the master (generally as a director) performs processing as described herein also performed by the non-masters to update its associated shared memory (on the same board) and its director local memory. In 442a, the master updates its state information by writing sync_start in the synch state field (of its entry in the table 215) and also updating the synch ID to correspond to the third synchronization point, synch 3, for the current global ID.

In response to a non-master viewing the master's information in the table 215 to reflect completion of synchronization point 2 (e.g., by the master writing sync-sync as in 422c of FIG. 6A), the non-master may perform processing of 444a which may include updating shared memory (on the board including the non-master if not already updated) and its director local memory. Such updating may include updating copies of global data items affected by the request which are stored in the shared and/or local memory. Such updating may include updating other data items which are dependent on the updated or modified global data items affected by the request whereby such other data items are stored in the shared and/or local memory. In step 444b, the non-master write synch_empty 444b to its entry in the table. In step 444c, each non-master updates its state to sync_ready once the shared memory and/or local memory have been updated and responsive to viewing the state change of the master in accordance with 442a.

Once the master waits the predetermined amount of time for the third synchronization point, the master may examine the state information to ensure that one or more non-masters have accordingly set their own state to sync_ready. For those directors which have not set their state to sync_ready (as in 444c) within the predetermined amount of time, the master may presume that such directors have failed and take appropriate steps as described herein (e.g., to disable each such director). If the master fails to update its state to sync_start or sync_sync, the non-masters may presume the master has failed and may take appropriate steps as described elsewhere herein (e.g., to disable the master, rollback any changes made to globally shared data, local copies, and the like). Assuming the master and one or more non-masters have not failed (as indicated by the non-masters setting their state to sync_ready 444c), the master updates its state in 442c to sync_sync thereby indicating that the criteria for the third synchronization point of the current global ID has been satisfied and processing may transition or proceed to further processing associated with achieving any next synchronization point for the current global ID. In connection with this particular example, no additional synchronization points are utilized. However, it will be appreciated by those skilled in the art that the details provided herein in connection with described synchronization points may be used in connection with any desired subsequent synchronization points.

In connection with techniques herein, the unique global ID associated with each different change request to modify a global data item may be characterized as a transaction identifier. The synchronization ID associated with a single synchronization point of the change request may be characterized as a step-level identifier identifying one step within the single transaction. For example with reference back to FIG. 4A, the example illustrated may be characterized as single transaction for change request processing to update the global data item. The first step of the transaction may be processing performed to obtain commitment from one or more non-masters for the change request. The end of the first step may be marked by the first synchronization point synch 1 732 denoting a transition to processing for the next second step in the transaction. The second step in the transaction may be processing performed to update the global data in GM. The end of the second step may be marked by the second synchronization point synch 2 734 denoting a transition to processing for the next third step in the transaction. The third step in the transaction may be processing performed to update shared and local memories refreshed with a copy of the updated global data. The end of the third step may be marked by the third synchronization point synch3 739. Each synchronization point may denote a point at which the directors or processors wait until the criteria as described herein for the point is satisfied or completed. In this manner, the techniques herein provide transactional based request processing including one or more steps and associated synchronization points when updating the globally shared data item.

It should be noted that multiple change requests may be received by the data storage system and, in one embodiment as described herein, only a single global change request may be processed at one time. The foregoing may be based on a presumption in an embodiment that any change to a globally accessible data item may potentially affect any other data item such as may be stored in local or shared memory. In such an embodiment, all globally shared data may be locked when making a change to any portion of the globally shared data in the system.

With reference back to FIGS. 6, 6A and 6B as described above, for any/all synchronization points, a sequence of synch states may be set by the master and non-masters. For example, with reference to FIG. 6, such states for the master include sync_start in 402*b* and sync_sync 402*c* (or alternatively sync_abort if request is aborted), and for the non-master include sync_empty 404*b* and sync_ready 404*c*. FIGS. 6A and 6B also include use of these particular sync states as in connection with, respectively, the subsequent second and third synchronization points. Generally, in between the different synchronization points, processing may be performed that may vary depending on the particular transaction and activities being synchronized. In connection with the example illustrated in FIGS. 6, 6A and 6B, between the first and synchronization points, the globally shared data item is updated (e.g., by the master) and any copies of the globally shared data item, or other content derived from the globally shared data item, are invalidated (e.g., as may be stored in other memories such as the shared and/or local memories of the directors). Between the second and third synchronization points, the directors update shared memory and/or local memories based on the updated globally shared data item (e.g., update shared memory and/or local memories to include updated copies of the globally shared data item or otherwise include updated content derived from the updated globally shared data item). More generally, any additional synchronization points that may be included in an embodiment may utilize synch states and perform any processing being synchronized as illustrated and described herein.

Figure 7:
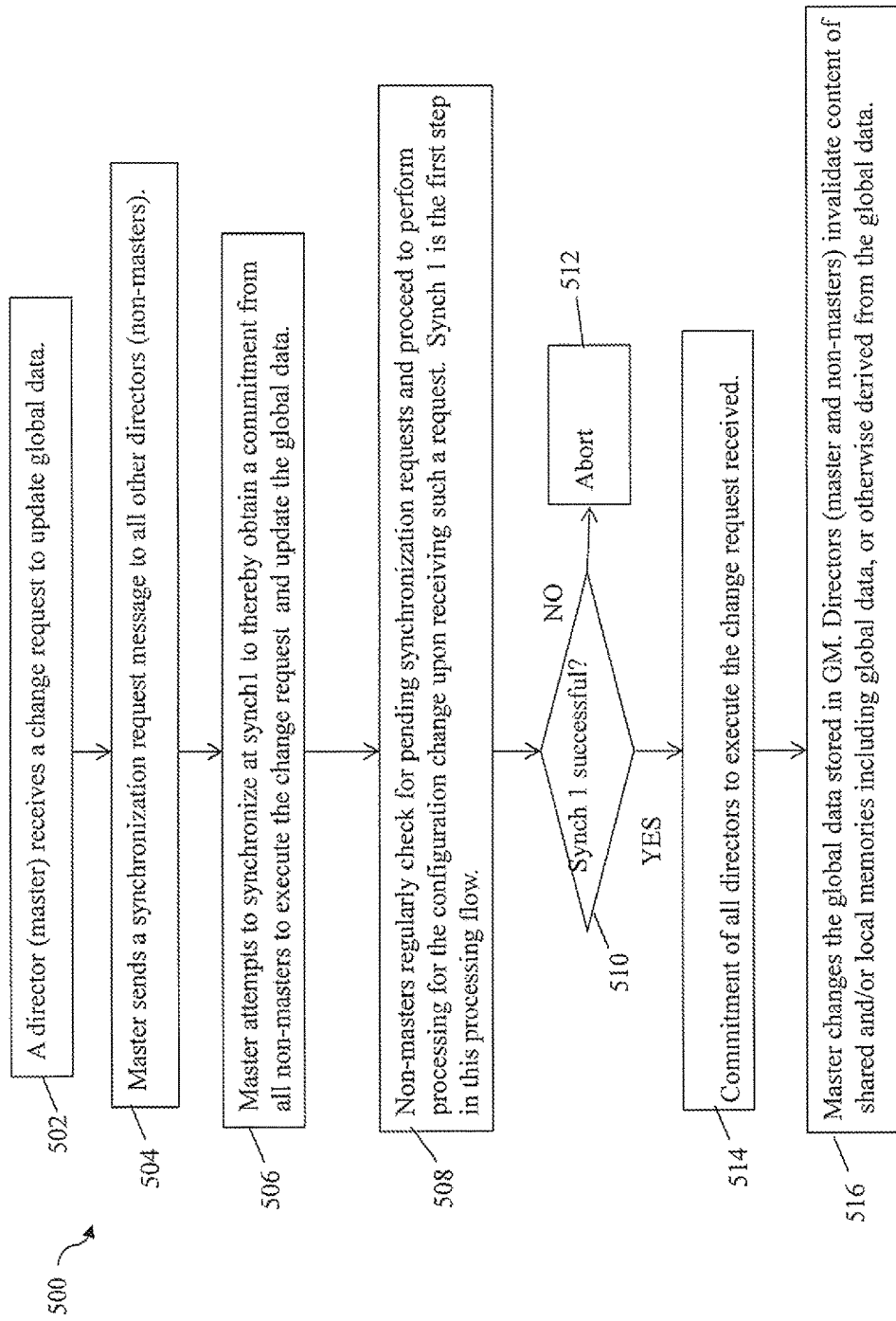
FIGS. 7, 8 and 9 are flowcharts of processing steps that may be performed in an embodiment in accordance with techniques herein.
Figure 8:
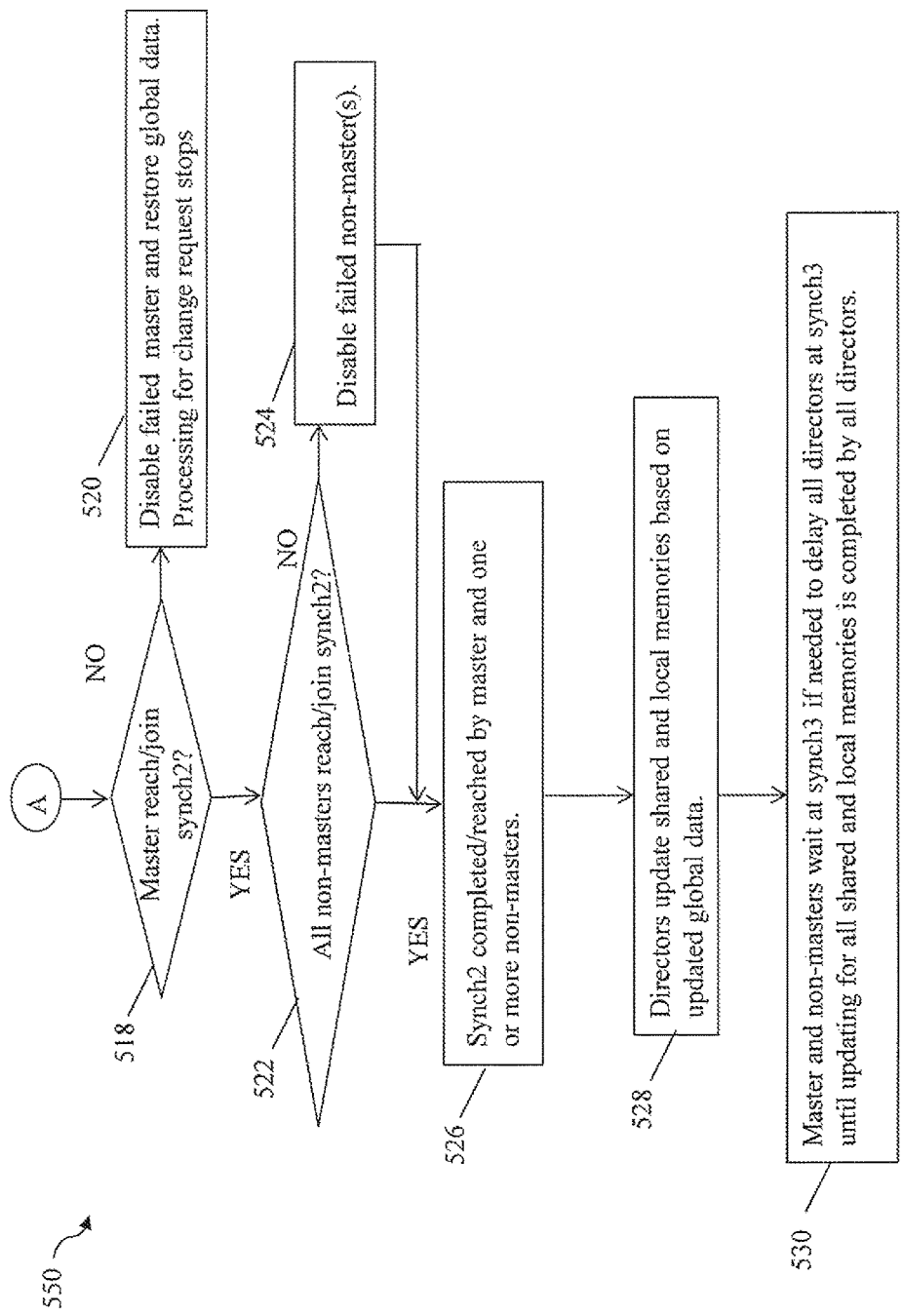

Referring to FIGS. 7 and 8, shown are flowcharts of processing steps that may be performed in an embodiment in accordance with techniques herein such as described using three synchronization points. The flowchart 500 summarized processing as described above in connection with the exemplary embodiment using three synchronization points (e.g., such as in connection with FIGS. 3, 4B, 6, 6A and 6B. It should be noted that the details illustrated in FIGS. 6, 6A and 6B have been omitted from the more generalized processing steps of FIGS. 7 and 8. At step 502, a director, acting as a master, receives a change request to update global data. In step 504, the master sends a synchronization request to all other directors acting as non-masters. In step 506, the master attempts to synchronize at synch1 to thereby obtain a commitment from all non-masters to execute the change request for updating the global data. In step 508, the non-masters regularly check for pending synchronization requests and process to perform processing for the configuration change upon receiving such a request. Synch1 is the first step in this processing flow. At step 510, a determination is made as to whether synch1 is successful in that all master and non-master directors have reached synch1 thereby denoting commitment of all directors to proceed with executing the change request received in step 502. If step 510 evaluates to no, control proceeds to step 512 to abort processing for the current change request received in step 502. If step 510 evaluates to yes, control proceeds to step 514 denoting commitment of all directors to execute the change request received. Processing now commences with the second step or process flow associated with achieving the second synchronization point synch2. At step 516, the master then performs the requested updates to the global data stored in GM. After successful completion of synch1 and before joining synch2, the directors (both master and non-masters) perform processing for the second synchronization synch2 where the directors invalidate copies of global data, or data items derived therefrom, such as may be stored in shared memory and/or local memory (private to each director). The non-masters wait at synch2 for the master to complete the updating of the global data. At step 518, a determination is made as to whether the master has reached or joined synch2. If step 518 evaluates to no, it means that the master has failed to reach synch2 such as, for example, due to the master experiencing a failure, exception or some other error condition. Control proceeds to step 520 to disable the master and restore the global data as prior to performing the update. Processing for the change request received in step 502 stops. If step 518 evaluates to yes, control proceeds to step 522 where a determination is made as to whether all non-masters have reached or joined synch2. If step 522 evaluates to no, control proceeds to step 524 to disable any such failed non-masters which have not reached or joined synch2. Control then proceeds to step 526 (assuming that the master and at least one non-master have reached or joined synch2). If step 522 evaluates to yes, control proceeds to step 526. At step 526, the directors (master and non-masters) update shared and local memories based on the updated global data. At step 530, the master and non-masters wait or synchronize at a third synchronization point synch3 to delay all directors at synch3 until updating for all shared and local memories is completed by all directors. Once all directors reach synch3, the directors may perform other processing and have completed the transaction for the change request. As described herein, use of such a third synchronization point may not be needed depending on the particular embodiment and global data which is updated.

Figure 9:
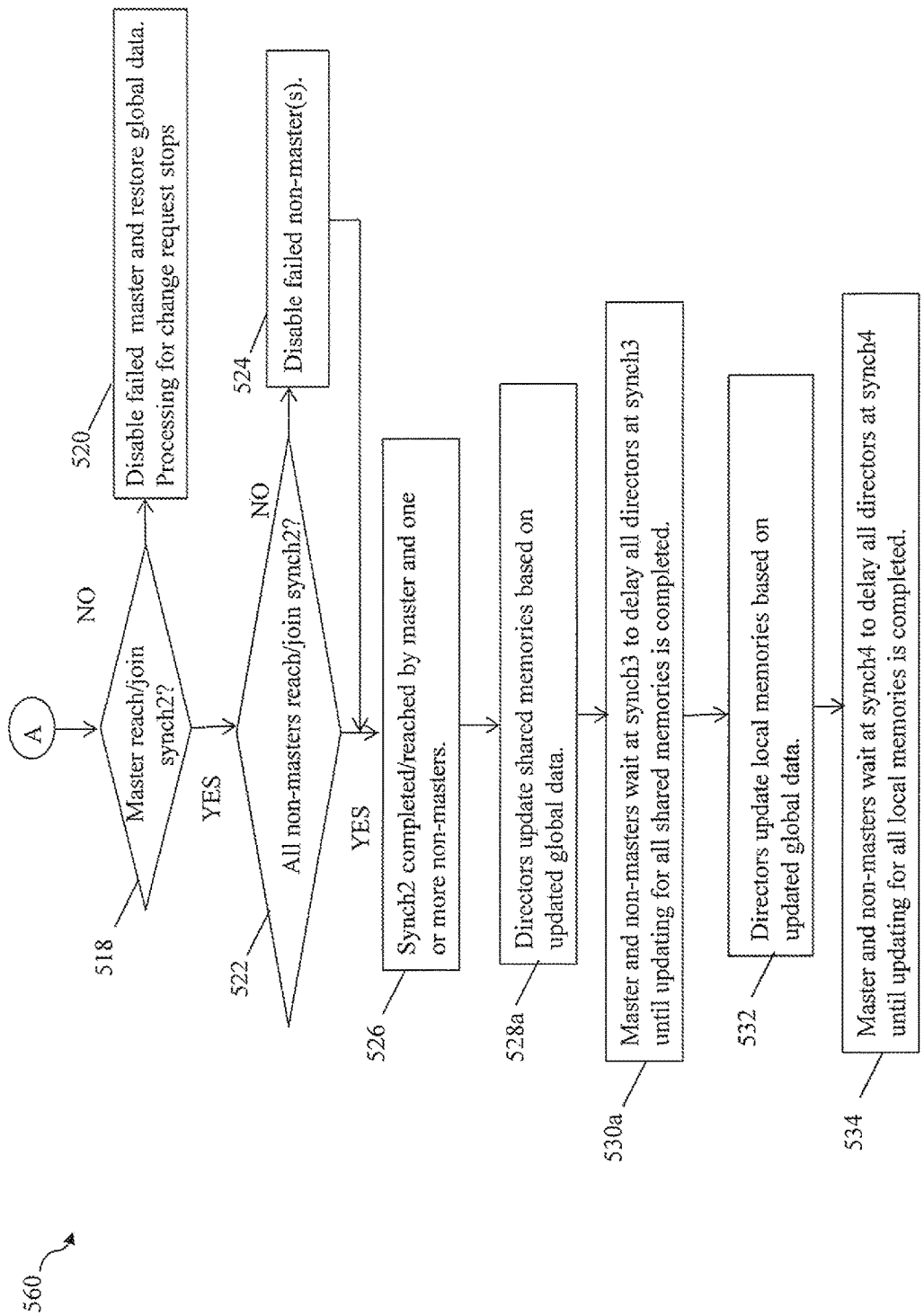

As described above, another example is provided herein such as in connection with FIG. 4B using four synchronization points. In connection with four synchronization points, the flowchart formed by FIGS. 7 and 9 (rather than FIGS. 7 and 8) summarizes processing steps described above. With reference to FIG. 9, shown is a flowchart 560 which includes steps to be performed in combination with FIG. 7 processing. Steps 518, 520, 522, 524 and 526 of FIG. 9 are as described in connection with FIG. 8. At step 528a, the directors update the shared memories based on the updated global data. In step 530a, the master and non-masters wait at synch3 until updating of all shared memories has completed thereby indicating that synch3 has been completed and processing may now proceed with steps toward completing a fourth step and associated synchronization point. In step 532, the directors update the local memories based on the updated global data. In step 534, the master and non-masters wait at synch4 until updating of all local memories has completed thereby indicating that synch4 has been completed. Once all directors reach synch4, the directors may perform other processing and have completed the transaction for the change request.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing a request to update a globally shared data item comprising:
    receiving the request at a first processor to update the globally shared data item, wherein said first processor is one of a plurality of processors which access said globally shared data item, said first processor being a master processor and each of the other ones of the plurality of processors being a non-master processor;
    sending, by the first processor to each of said other ones of the plurality of processors, a synchronization request message;
    waiting, by the first processor, a predetermined amount of time for each of the other ones of the plurality of processors to signal to the first processor in response to the synchronization request message that said each other processor commits to executing the request to update the globally shared data item;
    determining whether the first processor receives said signal from each of said other ones of the plurality of processors indicating commitment to executing the request to update the globally shared data item; and
    responsive to determining that all said other ones of the plurality of processors signal said first processor indicating commitment to executing the request to update the globally shared data item, performing first processing including:
        notifying, by said first processor, each of said other ones of the plurality of processors regarding completion of a first synchronization point;
        updating the globally shared data item by said first processor; and
        waiting, by each of said other ones of the plurality of processors, for notification from the first processor regarding completion of a second synchronization point thereby indicating that updating of the globally shared data item is completed.

2. The method of claim 1, wherein said other ones of the plurality of processors are delayed from further execution until the first processor sends notification regarding completion of the first synchronization point, and wherein said other ones of the plurality of processors are delayed from further execution until the first processor sends notification regarding completion of the second synchronization point.

3. The method of claim 2, further comprising:
    aborting the request if the first processor does not receive said signal from at least one of said other ones of the plurality of processors whereby not receiving said signal indicates that said at least one processor does not commit to executing the request to update the globally shared data item.

4. The method of claim 1, wherein responsive to said each of said other ones of the plurality of processors receiving notification from the first processor regarding completion of said second synchronization point, said each processor performs second processing to accordingly update one or more other data items dependent on said globally shared data item.

5. The method of claim 4, wherein each of the one or more other data items are any of a copy of at least a portion of said globally shared data item and a data item derived from said globally shared data item.

6. The method of claim 5, wherein at least a first of said one or more other data items are stored locally in a private memory accessible only to said each processor.

7. The method of claim 5, wherein at least a first of said one or more other data items are stored in a memory shared by said each processor and any other of said plurality of processors located on a same board as said each processor.

8. The method of claim 1, wherein if one of said other ones of the plurality of processors fails to reach the second synchronization point, said one processor is disabled by said first processor to prevent said one processor from continuing execution.

9. The method of claim 1, wherein if said first processor fails to reach the second synchronization point, said first processor is disabled thereby preventing said first processor from continuing execution and the globally shared data item is restored to its state prior to performing said updating the globally shared data item by said first processor.

10. The method of claim 5, further comprising:
    waiting, by each of said other ones of the plurality of processors, for notification from the first processor regarding completion of a third synchronization point thereby indicating that updating of one or more other data items by each of said other ones of the plurality of processors is completed.

11. The method of claim 10, wherein said other ones of the plurality of processors are delayed from further execution until the first processor sends notification regarding completion of the third synchronization point.

12. The method of claim 1, wherein said first synchronization point and said second synchronization point are included in a plurality of synchronization points corresponding to steps in a transaction performed to execute the request to update the globally shared data item.

13. The method of claim 12, wherein the plurality of synchronization points includes at least four synchronization points, wherein said other ones of the plurality of processors are delayed from further execution at each of said plurality of synchronization points until receiving notification from the first processor that said each synchronization point is completed.

14. The method of claim 1, wherein a global identifier is associated with said request to update the globally shared data item, said global identifier denoting a globally unique identifier differentiating said request from any other request to update any globally shared data item accessible to said plurality of processors.

15. The method of claim 14, wherein each of said first synchronization point and said second synchronization point is associated with a synchronization point identifier determined using the global identifier.

16. The method of claim 15, wherein N synchronization points are associated with the global identifier, N being an integer greater than two, and wherein the synchronization point identifier identifies an $i^{th}$ of the N synchronization points associated with the global identifier, wherein "i" is an integer greater than zero and less than N+1, and the synchronization point identifier identifying the $i^{th}$ synchronization point of the request identified by the global identifier is calculated as a sum of a first quantity and a value of "i", said first quantity being a mathematical product of the global identifier multiplied by N denoting the total number of synchronization points associated with the global identifier.

17. A non-transitory computer readable medium code stored thereon for processing a request to update a globally shared data item, the non-transitory computer readable medium comprising code stored thereon for:
  receiving the request at a first processor to update the globally shared data item, wherein said first processor is one of a plurality of processors which access said globally shared data item, said first processor being a master processor and each of the other ones of the plurality of processors being a non-master processor;
  sending, by the first processor to each of said other ones of the plurality of processors, a synchronization request message;
  waiting, by the first processor, a predetermined amount of time for each of the other ones of the plurality of processors to signal to the first processor in response to the synchronization request message that said each other processor commits to executing the request to update the globally shared data item;
  determining whether the first processor receives said signal from each of said other ones of the plurality of processors indicating commitment to executing the request to update the globally shared data item; and
  responsive to determining that all said other ones of the plurality of processors signal said first processor indicating commitment to executing the request to update the globally shared data item, performing first processing including:
    notifying, by said first processor, each of said other ones of the plurality of processors regarding completion of a first synchronization point;
    updating the globally shared data item by said first processor; and
    waiting, by each of said other ones of the plurality of processors, for notification from the first processor regarding completion of a second synchronization point thereby indicating that updating of the globally shared data item is completed.

18. The computer readable non-transitory medium of claim 17, wherein said other ones of the plurality of processors are delayed from further execution until the first processor sends notification regarding completion of the first synchronization point, and wherein said other ones of the plurality of processors are delayed from further execution until the first processor sends notification regarding completion of the second synchronization point.

19. The non-transitory computer readable medium of claim 18, further comprising code for:
  aborting the request if the first processor does not receive said signal from at least one of said other ones of the plurality of processors whereby not receiving said signal indicates that said at least one processor does not commit to executing the request to update the globally shared data item.

20. A system comprising:
  a plurality of processors;
  a global memory including a globally shared data item accessed by said plurality of processors;
  a non-transitory computer readable medium comprising code stored thereon for processing a request to update the globally shared data item, the non-transitory computer readable medium comprising code for:
    receiving the request at a first of the plurality of processors to update the globally shared data item, said first processor being a master processor and each of the other ones of the plurality of processors being a non-master processor;
    sending, by the first processor to each of said other ones of the plurality of processors, a synchronization request message;
    waiting, by the first processor, a predetermined amount of time for each of the other ones of the plurality of processors to signal to the first processor in response to the synchronization request message that said each other processor commits to executing the request to update the globally shared data item;
    determining whether the first processor receives said signal from each of said other ones of the plurality of processors indicating commitment to executing the request to update the globally shared data item; and
    responsive to determining that all said other ones of the plurality of processors signal said first processor indicating commitment to executing the request to update the globally shared data item, performing first processing including:
      notifying, by said first processor, each of said other ones of the plurality of processors regarding completion of a first synchronization point;
      updating the globally shared data item by said first processor; and
      waiting, by each of said other ones of the plurality of processors, for notification from the first processor regarding completion of a second synchronization point thereby indicating that updating of the globally shared data item is completed.

* * * * *